US00H002075H

(19) United States

(12) Statutory Invention Registration (10) Reg. No.: US H2075 H

Gnauck et al. (43) Published: Aug. 5, 2003

(54) RESTORABLE ARCHITECTURES FOR FIBER-BASED BROADBAND LOCAL ACCESS NETWORKS

(75) Inventors: Alan H. Gnauck, Middletown, NJ (US); Adel Abdel Moneim Saleh, Holmdel, NJ (US); Sheryl Leigh Woodward, Holmdel, NJ (US)

(73) Assignee: AT&T Corp., New York, NY (US)

(21) Appl. No.: 09/170,517

(22) Filed: Oct. 13, 1998

(51) Int. Cl.[7] ..... H04J 14/00; H04B 10/20

(52) U.S. Cl. ..... 359/118; 359/124; 359/125; 359/127

(58) Field of Search ..... 359/118, 124, 359/125, 127

(56) References Cited

U.S. PATENT DOCUMENTS

| | | | | | |
|---|---|---|---|---|---|
| 5,349,457 | A | * | 9/1994 | Bears | 359/118 |
| 5,539,564 | A | * | 7/1996 | Kumozaki et al. | 359/137 |
| 5,550,666 | A | * | 8/1996 | Zirngibl | 359/124 |
| 5,579,421 | A | * | 11/1996 | Duvall et al. | 359/124 |
| 5,898,801 | A | * | 4/1999 | Braun et al. | 359/119 |
| 6,108,112 | A | * | 8/2000 | Touma | 359/110 |
| 6,226,111 | B1 | * | 5/2001 | Chang et al. | 359/110 |

OTHER PUBLICATIONS

C. Desem, "Optical Interference in Lightwave Subcarrier Multiplexing Systems Employing Multiple Optical Carriers," Electronics Letters, Jan. 7, 1988, vol. 24, No. 1, pp. 50–52.

C. Dragone, et al., "Integrated Optics N X N Multiplexer On Silicon," IEEE Photonics Technology Letters, Oct. 10, 1991, vol. 3, No. 10, pp. 896–899.

N. J. Frigo, et al., "A Wavelength–Division Multiplexed Passive Optical Network With Cost–Shared Components," IEEE Photonics Technology Letters, Nov. 11, 1994, vol. 6, No. 11, pp. 1365–1367.

X. Lu, et al., OFC, Mini–Fiber–Node Hybrid Fiber Coax Networks For Two–Way Broadband Access, OFC '96 Technical Digest, pp. 143–144.

Stuart S. Wagner, et al., "Multiwavelength Ring Networks For Switch Consolidation And Interconnection", International Conference on Communications, IEEE, pp. 1173–1179.

T. Song–Ho Wu, "Sonet Self–Healing, Rings (SHRs)", Fiber Network Service Survivability, Chapter 4, pp. 123–211.

Nicholas J. Frigo, "A Survey Of Fiber Optics In Local Access Architures", in Optical Fiber Telecommunications IIIA, Chapter 13, pp. 461–522, (1997).

"Route Diversity in Fiber Networks Using Optical Switching", M. Corke, A. Beaudet, P. Dwyer, D. Haynes, R. Kleckowski, R. Moran, D. Werthman and N. Ronan. SPIE vol. 1577 High–Speed Fiber Network and Channels (1991) pp. 41–51.

* cited by examiner

*Primary Examiner*—Daniel T. Pihulic

(74) *Attorney, Agent, or Firm*—Kenyon & Kenyon

(57) ABSTRACT

The present invention provides a local access network, having a switching node, a passive remote node connected to an optical network unit, a first optical fiber that provides a dedicated connection between the switching node and the passive remote node, and a second optical fiber that provides a dedicated connection between the switching node and the passive remote node. A first portion of a first fiber-optic cable containing the first optical fiber does not contain any part of the second optical fiber, such that there are independent paths from the switching node to the passive remote node.

36 Claims, 25 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

1700

1770
1760
1715a
1718
LASER
1740
1710a
1715b
ELECTRONICS
1710b
1730
RECEIVER
1750
1777
1717
OPTICAL SWITCHES
CONTROL SIGNAL

1800

1860
MODULATOR
1815
1867
ELECTRONICS
1810
1865
RECEIVER
1850

2600

2670
2622
LASER
2660
MUX
2615
ELECTRONICS
RECEIVERS
2610
2650
DEMUX
2621

RESTORABLE ARCHITECTURES FOR FIBER-BASED BROADBAND LOCAL ACCESS NETWORKS

BACKGROUND OF THE INVENTION

A local access network is a network that connects individual users, i.e., subscribers, to a central office (CO), either directly or through one or more host digital terminals and/or remote nodes. The CO is a switching node which is a part of a larger network. For example, in the historic telephony network, the CO was responsible for serving one or more telephone exchanges, i.e., groups of subscribers sharing the first three digits of a seven digit telephone number, and was a part of the larger telephony network. The larger telephony network comprised several COs connected to each other by interexchange trunks, and also connected to long-distance networks.

Historically, twisted-pair copper wires were used to connect a CO to individual users. However, widespread broadband access is anticipated in the near future, and copper wires have a limited capacity. Optical fiber, on the other hand, has excellent transmission characteristics, and a capacity that far exceeds that of copper wire. As a result, optical fiber is a preferred choice for new communication infrastructures. Because it is expensive to install and upgrade infrastructure, new infrastructure is preferably "future-proof," i.e., able to support any conceivable service for the foreseeable future. The high capacity of optical fiber offers the potential of a future-proof infrastructure.

Optical fiber is also being deployed into local access networks with increasing frequency. Examples of local access network structures that incorporate fiber-optic cable can be found in N. Frigo, A Survey of Fiber Optics in Local Access Architectures, ch. 13 of Optical Fiber Communications, volume IIIA (Kaminow and Koch, eds., 1997). Existing local access network architectures incorporating optical fiber are usually similar to the architectures used for the older, copper wire networks. However, optical fibers are very different from copper wires, and these existing architectures may not be well suited for use with optical fibers. For example, optical fibers are typically congregated into fiber-optic cables containing many optical fibers and are capable of serving a far greater number of users than a copper cable of comparable size. As a result, a single cut in a fiber-optic cable could interrupt service to a larger group of users than a cut in a copper wire of similar size. An interruption of service to such a larger group of users from a single cable cut may be considered unacceptable. As a result, there is a need for a new architecture for local access networks that is more reliable than existing architectures.

FIG. 1 (prior art) shows a simplified schematic of an unprotected local access network 100 serving a cable group. As used herein, the term "cable group" refers to all of the homes, apartments and offices served by one cable. A CO 110 is connected to the backbone of a communications network (not shown). A fiber-optic cable 120 comprises a plurality of optical fibers 140, each of which may be connected to CO 110. In particular, CO 110 may have one or more central office transceivers (COTs) 115; each optical fiber in fiber-optic cable 120 may be connected to a COT 115. At a Cable Access Point (CAP) 130, an optical fiber 140 is separated from fiber-optic cable 120, and is connected to a remote node (RN) 150. If optical fiber 140, as separated from fiber-optic cable 120, cannot reach RN 150, the length of optical fiber 140 may be increased by splicing an additional piece of optical fiber onto the end of optical fiber 140. This additional piece of optical fiber is considered a part of optical fiber 140. Such splicing may be performed generally and is not limited to the architecture of FIG. 1.

RN 150 is also connected by an optical fiber 160 to an optical network unit (ONU) 170. RN 150 may also be connected to a number of other ONUs similar to ONU 170, by optical fibers similar to optical fiber 160. RN 150 is adapted to split an optical signal from optical fiber 140 into N optical signals, one for each ONU connected to RN 150, and/or to combine N optical signals, one from each ONU connected to RN 150, into a single optical signal for optical fiber 140. For example, RN 150 may be a 1×N optical star coupler, adapted to split the optical signal from fiber 140 into N identical signals, one for each ONU connected to RN 150. RN 150 may also be a wavelength grating router (WGR), adapted to split the optical signal from optical fiber 140 into N possibly different signals, differentiated by wavelength, one for each ONU connected to RN 150. As used herein, "ONU" refers to a terminal part of a local access network that provides an interface between the local access network and customer premises equipment (CPE), such as a telephone, facsimile machine, television, and/or computer. For example, an optical network unit may serve one or more houses, offices, or apartments. In the architecture of FIG. 1, a failure between a CAP 130 and ONUs 170 may leave N ONUs without service. However, a failure of fiber-optic cable 120 may leave the entire cable group without service.

FIG. 1 also shows two CAPs in addition to CAP 130, two RNs in addition to RN 150, each connected to three ONUs, such as ONU 170. These CAPs, RNs, and ONUs function in a manner similar to CAP 130, RN 150, and ONU 170. For clarity, FIG. 1 shows only three CAPs, including CAP 130, each having a single RN, such as RN 150, where each RN is connected to three ONUs, such as ONU 170. In reality, a local access architecture may have many more CAPs, RNs and ONUs. For example, in a typical telephony network, a single CO might be connected to on the order of hundreds of RNs 150 through a single fiber-optic cable, and each RN 150 might be connected to about 1–64 ONUs 170, or more likely 32–64 ONUs 170. These numbers are, of course, subject to wide variations, depending on the needs of the community served by the local access network.

Also for clarity, FIG. 1 shows ONU 170 connected to only a single RN 150. However, it is known to provide multiple connections from a single ONU to multiple RNs, for the purpose of providing multiple channels to each ONU. For example, one optical fiber could be used for transmissions to the ONU, and another could be used for transmissions from the ONU. Where such multiple connections are provided, each of optical fibers 140 and 160 as shown in FIG. 1 represent two or more optical fibers. FIG. 1 also shows only a single optical fiber 140 separated from fiber-optic cable 120 at CAP 130. However, it is known to separate a plurality of optical fibers at a CAP for the purpose of connecting to a plurality of RNs. Multiple RNs at a CAP could provide multiple connections to each ONU for the purpose of providing multiple channels, or could be connected to ONUs too numerous or too inconveniently located to be served by a single RN.

Large quantities of optical fiber have already been deployed in the backbones of telephone networks, which serve millions of users. It has long been realized that a cable cut in one of these backbones, which could affect hundreds of users, must not interrupt service for more than a moment. The high reliability required of the backbone is often achieved by using a Synchronous Optical NETwork (SONET) ring architecture.

FIG. 2 (prior art) shows a SONET ring architecture. SONET ring 200 has a plurality of COs 210, including CO 210*a,* CO 210*b,* CO 210*c* and CO 210*d.* Each CO has an add-drop multiplexer (ADM) 215. In particular, COs 210*a,* 210*b,* 210*c* and 210*d* have ADMs 215*a,* 215*b,* 215*c* and 215*d,* respectively. An ADM is a network element that can add and drop signals, such as SONET signals, from a line signal. Each CO 210 may also be connected to a local access architecture (not shown), and one or more of the COs 210 may also be connected to a larger communications network (not shown). ADM 215*a* is connected to ADM 215*b* by fiber-optic cables 220*a* and 230*a.* ADM 215*b* is connected to ADM 215*c* by fiber-optic cables 220*b* and 230*b.* ADM 215*c* is connected to ADM 215*d* by fiber-optic cables 220*c* and 230*c.* ADM 215*d* is connected to ADM 215*a* by fiber-optic cables 220*d* and 230*d.* If a cut occurs in any of the fiber-optic cables, there is at least one and possibly more alternate routes between the two ADMs connected by the failed fiber-optic cable. COs 210 are switching nodes, where the switching function is performed by ADMs 215. As such, COs 210 require power and significant maintenance.

A number of SONET ring architectures are described in Chapter 4 of Wu, *Fiber Network Service Survivability* (1992), which is incorporated by reference. Each of these architectures is similar to the architecture of FIG. 2, in that the SONET ring has a number of switching nodes, and alternate paths are provided between the switching nodes. If a cable cut occurs, data can be routed through an alternate path. Architectures similar to SONET ring architectures for a local access network are described by Chapter 8 of Wu, *Fiber Network Service Survivability* (1992), which is incorporated by reference. For example, Wu describes a number of architectures having a CO connected to a RN by a primary route and an alternate route, where the RN has an optical switch that chooses which route to use. While these architectures provide good reliability, they rely on switches distributed throughout the local access network in the RNs. It is very undesirable to have switches distributed throughout a local access network, because such switches require power and maintenance, and providing power and maintenance at decentralized locations significantly increases cost.

A ring architecture having switching functions consolidated to some degree at a single node is disclosed by Wagner et al., *Multiwavelength Ring Networks for Switch Consolidation and Interconnection,* IEEE International Conference on Communications, page 1173 (1992). However, this ring architecture has "many concatenated passive components," due to the bus architecture used by Wagner. As a result, the number of nodes that can be supported by the architecture is very low, on the order of 10, unless components that require power, such as amplifiers, are distributed throughout the network. Moreover, each node in the architecture has "electronic selection," which also requires power. A local area network may require a number of nodes far greater than 10.

Most existing local access network architectures have neither the capacity nor the level of reliability provided by a SONET ring and similar architectures. Moreover, the economics of local access network architectures are very different from those of the backbone of a communication network, such that providing an architecture similar to that of SONET rings in the local access network is a very expensive proposition. In particular, SONET rings and similar architectures are based on several switching nodes that require power connected by fiber-optic cable, or nodes having some other functionality that requires power. In a local access network, providing power at nodes distributed throughout the network significantly raises cost. Moreover, a local access network may have many remote nodes. As a result, there is a need for a local access network architecture adapted to serve many nodes that has a high reliability, and does not require power at locations other than the CO and the ONUs. In addition, the expense of laying fiber is significant. There is therefore a further need for a high reliability local access network in which optical fiber is deployed in a cost-effective manner.

SUMMARY OF THE INVENTION

The present invention provides a local access network, having a switching node, a passive remote node connected to an optical network unit, a first optical fiber that provides a dedicated connection between the switching node and the passive remote node, and a second optical fiber that provides a dedicated connection between the switching node and the passive remote node. A first portion of a first fiber-optic cable containing the first optical fiber does not contain any part of the second optical fiber, such that there are independent paths from the switching node to the passive remote node.

The present invention further provides a local access network, having a switching node, a first passive remote node, a first optical fiber connecting the switching node to the first passive remote node, a second passive remote node, a second optical fiber connecting the switching node to the second passive remote node, an optical network unit, a third optical fiber connecting the first passive remote node to the optical network unit, and a fourth optical fiber connecting the second passive remote node to the optical network unit. A first portion of a first fiber-optic cable containing the first optical fiber does not contain any part of the second optical fiber, such that there are independent paths from the switching node to the optical network unit.

DETAILED DESCRIPTION

Figure 1:
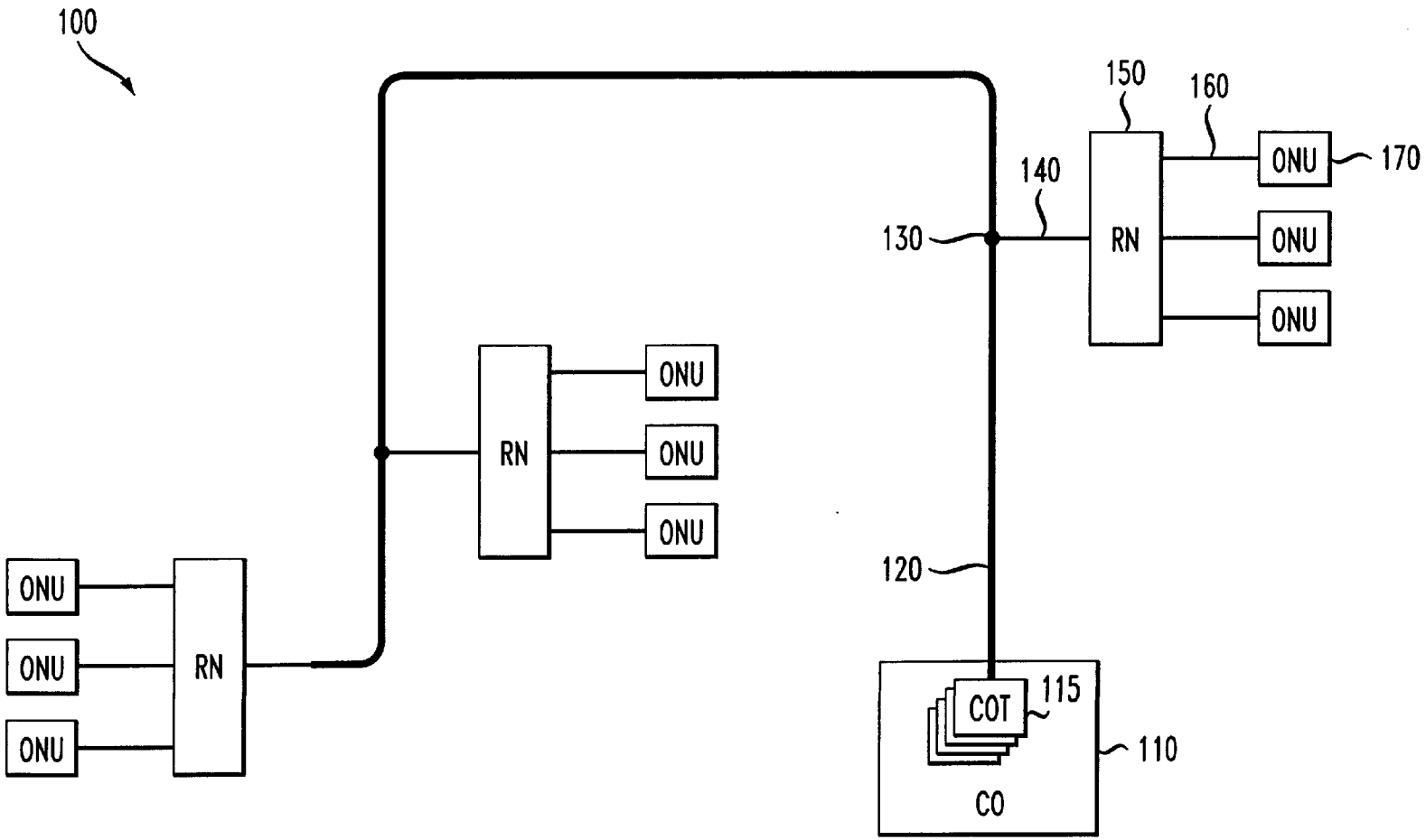
FIG. 1 (PRIOR ART)
FIG. 1 (prior art) shows a simplified schematic of an unprotected local access network 100 serving a cable group.
Figure 2:
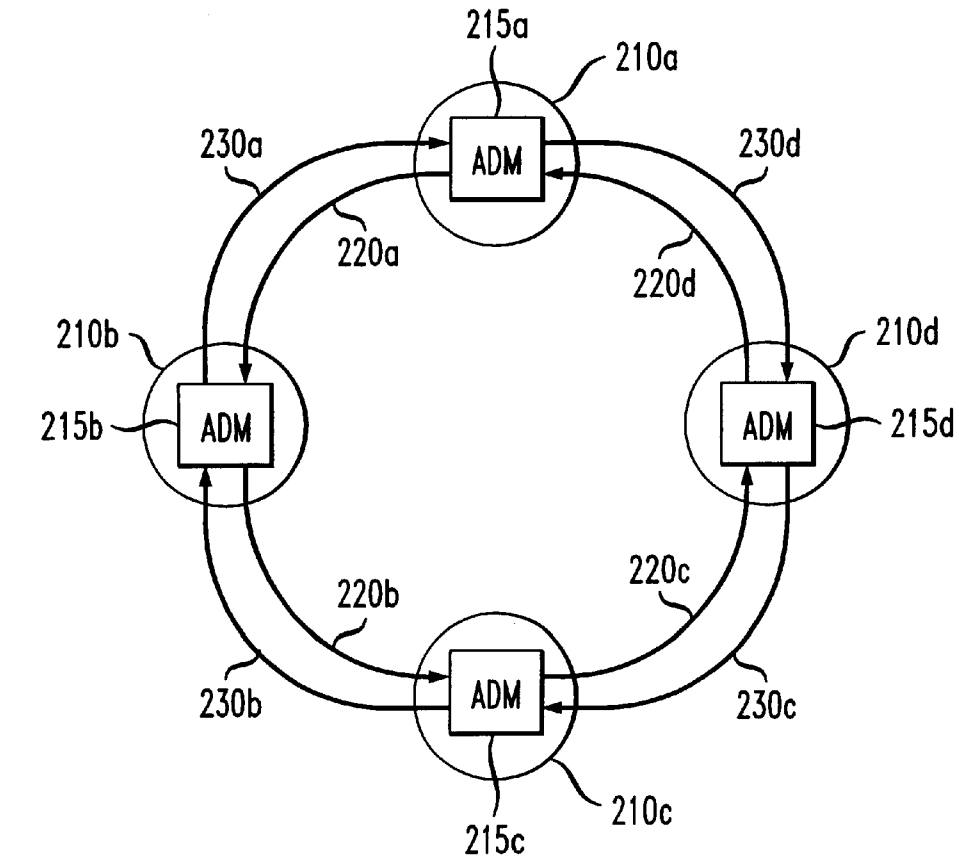
FIG. 2 (PRIOR ART)
FIG. 2 (prior art) shows a SONET ring architecture.

The present invention provides a local access network architecture that improves the network's reliability in a cost-effective way. The improved reliability is achieved by providing alternate paths through optical fibers for communications between a switching node, such as a central office (CO), and an optical network unit (ONU). These alternate paths are implemented without requiring power at locations in the local access network other than the switching node and the ONUs. As a result, RNs in the network may be referred to as "passive" RNs, because they do not have any active components, such as switches or amplifiers, that require power. Using passive RNs and avoiding components that require power, other than at the ONU and the switching node, may lead to significant cost savings relative to an architecture having components that require power.

Preferably, the connection between the switching node and each RN is a "dedicated" connection. As used herein, an optical fiber provides a "dedicated" connection between two endpoints if signals are not added or dropped from the optical fiber between the two endpoints. For example, a multiplexer between the two endpoints would interfere with the dedicated nature of the connection, whereas an amplifier would not. More preferably, the connection between the switching node and a particular RN is a "direct" connection. As used herein, an optical fiber provides a "direct" connection between two endpoints if the fiber is not interrupted by any components between the two endpoints. Two fibers spliced together to form a single fiber having a splice may form a direct connection.

The present invention may be used to provide "cable redundancy," where alternate paths through optical fibers are provided for at least the communications between the switching node and a RN, but where alternate paths are not necessarily provided for the connections between the RN and a plurality of ONUs. Cable redundancy provides protection from a cut in the fiber-optic cable between the CO and the RNs, which could affect every user in a cable group. However, cable redundancy may not provide protection from a cut optical fiber between the RN and the ONU. If the number of users served by an ONU is sufficiently small that an interruption of service to those users is considered acceptable, cable redundancy may be sufficient.

The present invention may also be used to provide "full-fiber redundancy," where alternate paths are provided for all fiber between the CO and the ONUs. Full-fiber redundancy provides protection from a cut optical fiber between the CO and the ONU, regardless of whether the cut is between the CO and the RN, or between the RN and the ONU. While providing full-fiber protection for every ONU approximately doubles the cost of the optical fiber in the local access network, the cost of the local access network is not necessarily doubled, because the same ONU and COT may be used for both paths.

The present invention may be applied to any local access network architecture that uses optical fiber. For example, the present invention may be applied to a power-splitting or broadcast passive-optical-network (PON) architecture, where the passive RNs are star-couplers. Such a PON is known as a "power-splitting" PON, or a "broadcast" PON, because the downstream light is split (broadcast) to all of the users. A power-splitting PON may employ separate fibers and star-couplers for upstream and downstream traffic, or the upstream and downstream traffic may be carried over the same fibers and couplers. The present invention may also be applied to a wavelength-division multiplexed (WDM) PON architecture, where the passive RNs are wavelength grating routers (WGRs). The present invention may be used in conjunction with any architecture for connecting the ONU to the CPE, such as a mini-Fiber Node (mFN) architecture, which is a hybrid fiber-coax distribution network that uses optical fibers to connect a CO to an ONU, and a coaxial bus to connect the ONU to one or more homes, offices or apartments. The present invention may be applied to other architectures as well.

The RNs used by the present invention may be any passive components adapted to split and/or combine optical signals without using power, such that a single RN may transmit signals from a switching node to a plurality of ONUs. For example, the RNs may be optical star couplers, in which case a signal from the switching node is split, and the same signal is sent to all ONUs connected to the RN. Also, the RNs may be wavelength grating routers (WGRs), in which case the RN could separate multiple signals from the switching node based on wavelength, and send a different signal to each ONU. Signals sent from the ONUs through the RN to the switching node could also be distinguished based on wavelength. Similarly, other passive components adapted to split and/or combine optical signals without using power may be used.

Full-Fiber Redundancy, Separate Cables

Figure 3:
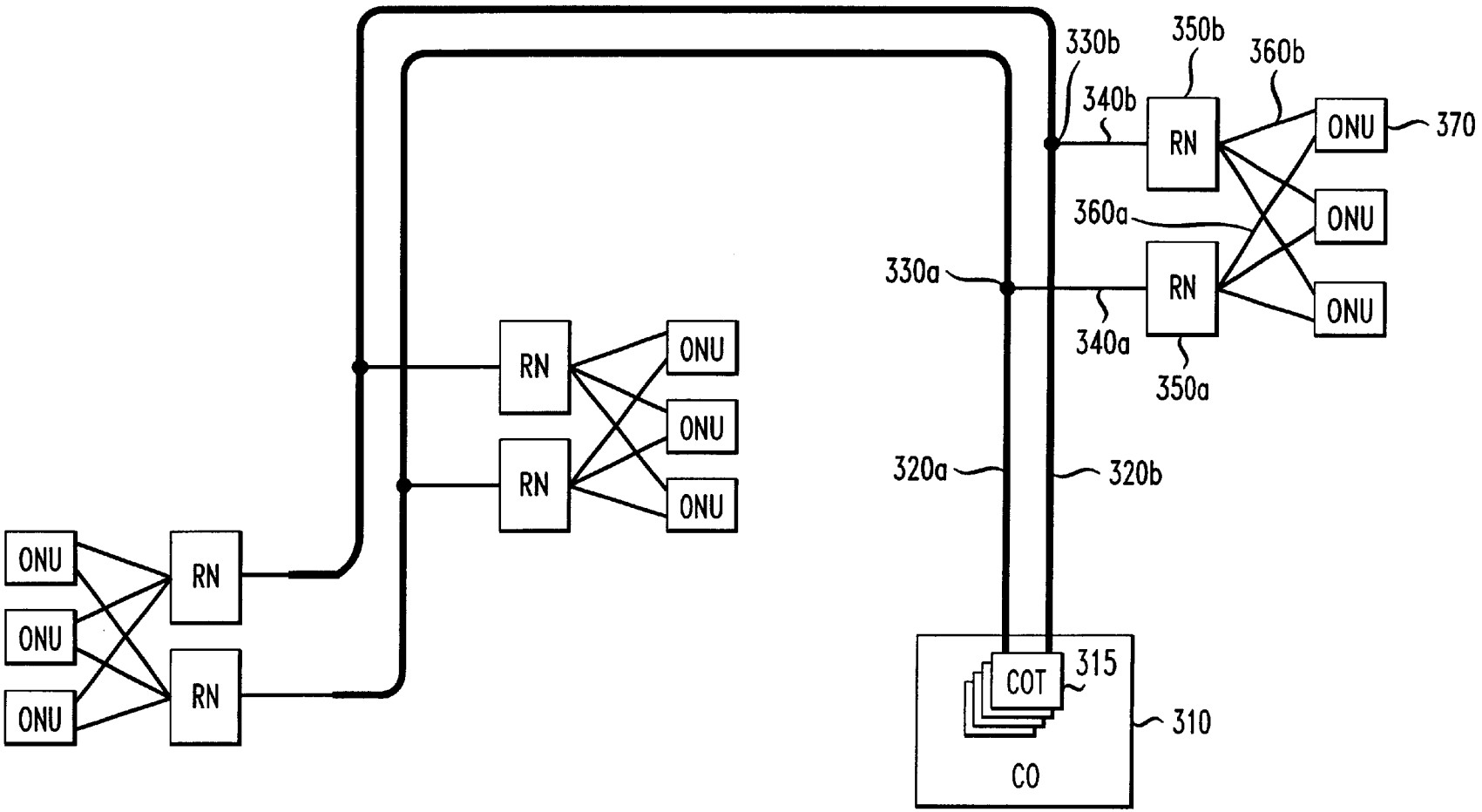
FIG. 3 shows an embodiment of the present invention that provides full-fiber redundancy by using two fiber-optic cables.

FIG. 3 shows an embodiment of the present invention that provides full-fiber redundancy by using two fiber-optic cables 320, i.e., fiber-optic cables 320*a* and 320*b*, each having one end connected to a switching node 310. Switching node 310 may be a CO having one or more COTs 315 connected to fiber-optic cables 320. At a Cable Access Point (CAP) 330*a*, an optical fiber 340*a* is separated from fiber-optic cable 320*a*, and is connected to a RN 350*a*. An ONU 370 is connected to RN 350*a* by an optical fiber 360*a*. Similarly, at a CAP 330*b*, an optical fiber 340*b* is separated from fiber-optic cable 320*b*, and is connected to a RN 350*b*. ONU 370 is connected to RN 350*b* by an optical fiber 360*b*.

The architecture of FIG. 3 includes two independent paths between ONU 370 and switching node 310 via optical fiber. One of these paths runs through optical fiber 360*a*, RN 350*a*, and optical fiber 340*a*, which is contained by fiber-optic cable 320*a*. The second path runs through optical fiber 360*b*, RN 350*b*, and optical fiber 340*b*, which is contained by fiber-optic cable 320*b*. Similarly, each ONU in the architecture can have two independent paths through optical fiber to switching node 310. As a result, every ONU in the network will have a path through optical fiber to switching node 310, even if an optical fiber or fiber-optic cable is cut anywhere in the local access network.

If multiple active paths between CO 310 and ONU 370 are desired, for example to provide separate paths for communications to ONU 370 and communications from ONU 370, additional paths may be provided in parallel to those shown in FIG. 3. The provision of parallel paths is applicable to all embodiments of the present invention.

Preferably, fiber-optic cables 320*a* and 320*b* take alternate routes through the cable group, to reduce the chance that a single event would cut both cables. This could be achieved in an urban area, for example, by running the separate fiber-optic cables on opposite sides of a street.

Cable Redundancy, Separate Cables

Figure 4:
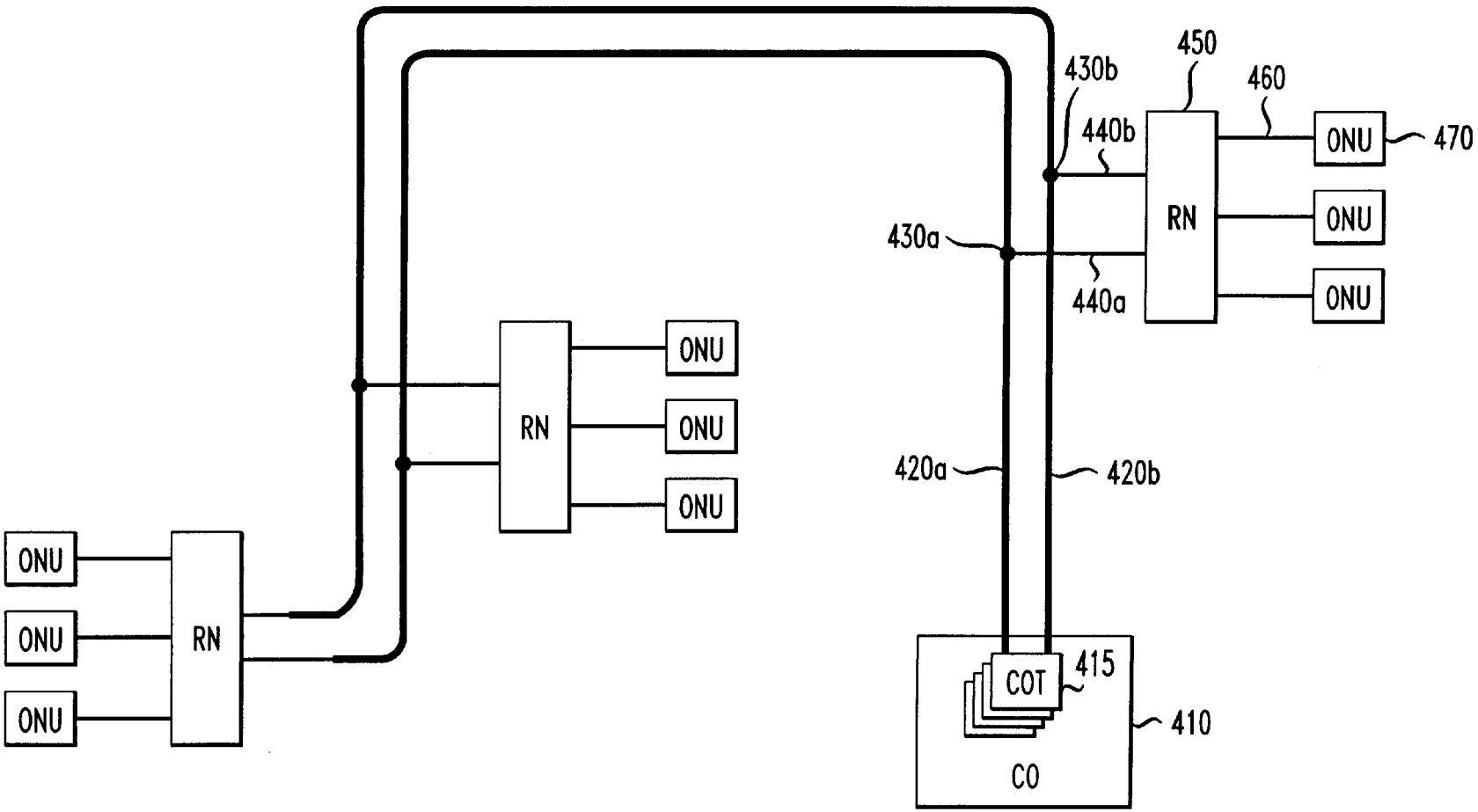
FIG. 4 shows an embodiment of the present invention that provides cable redundancy by using two fiber-optic cables.

FIG. 4 shows an embodiment of the present invention that provides cable redundancy by using two fiber-optic cables 420, i.e., fiber-optic cables 420*a* and 420*b*, each having one end connected to a switching node 410. Switching node 410 may be a CO having one or more COTs 415 connected to fiber-optic cables 420. At a CAP 430*a*, an optical fiber 440*a* is separated from fiber-optic cable 420*a*, and is connected to a RN 450. Similarly, at a CAP 430*b*, an optical fiber 440*b* is separated from fiber-optic cable 420*b*, and is connected to RN 450. An ONU 470 is connected to RN 450 by an optical fiber 460.

In a manner similar to the embodiment of FIG. 3, it is preferable that fiber-optic cables 420*a* and 420*b* of the embodiment of FIG. 4 take alternate routes through the cable group, to reduce the chance that a single event would cut both cables.

The architecture of FIG. 4 includes two independent paths between switching node 410 and RN 450 via optical fiber. One of these paths runs through optical fiber 440*a*, which is contained by fiber-optic cable 420*a*, and the other runs through optical fiber 440*b*, which is contained by fiber-optic cable 420*b*. However, there is only a single path from RN 450 to ONU 470, through optical fiber 460. Similarly, there are two independent paths between each RN in the network and switching node 410, but only a single path from each ONU to a RN. As a result, every ONU in the network will have a path through optical fiber to switching node 410, even if an optical fiber or fiber-optic cable is cut between a RN and switching node 410. A cut in an optical fiber between a RN and an ONU will interrupt service, but only to a single ONU. However, if a failure occurs in a RN, service might be interrupted to all of the "N" ONUs connected to the RN. In addition, to reduce the costs of installation, the connections between a RN and the two cables 420*a* and 420*b* may not be independent, and/or the connections between a RN and the ONUs connected to the RN may not be independent. In this situation, the failure group size might be as large as the N ONUs connected to a RN.

Full-fiber redundant networks, such as the network of FIG. 3, have a failure group size of zero, while cable-redundant networks, such as the network of FIG. 4, have a failure group size potentially as large as N. While cable-redundant networks offer less protection, they may still be viable architectures, due to lower costs. In addition, the types of failures that might interrupt service in a cable-redundant network occur between the CAP and the ONU, and this type of failure is typically easily located and quickly repaired, as opposed to failures in the cable between the CAP and the CO, which may be more difficult to locate and repair.

Full-Fiber Redundancy, Cable Ring

Figure 5:
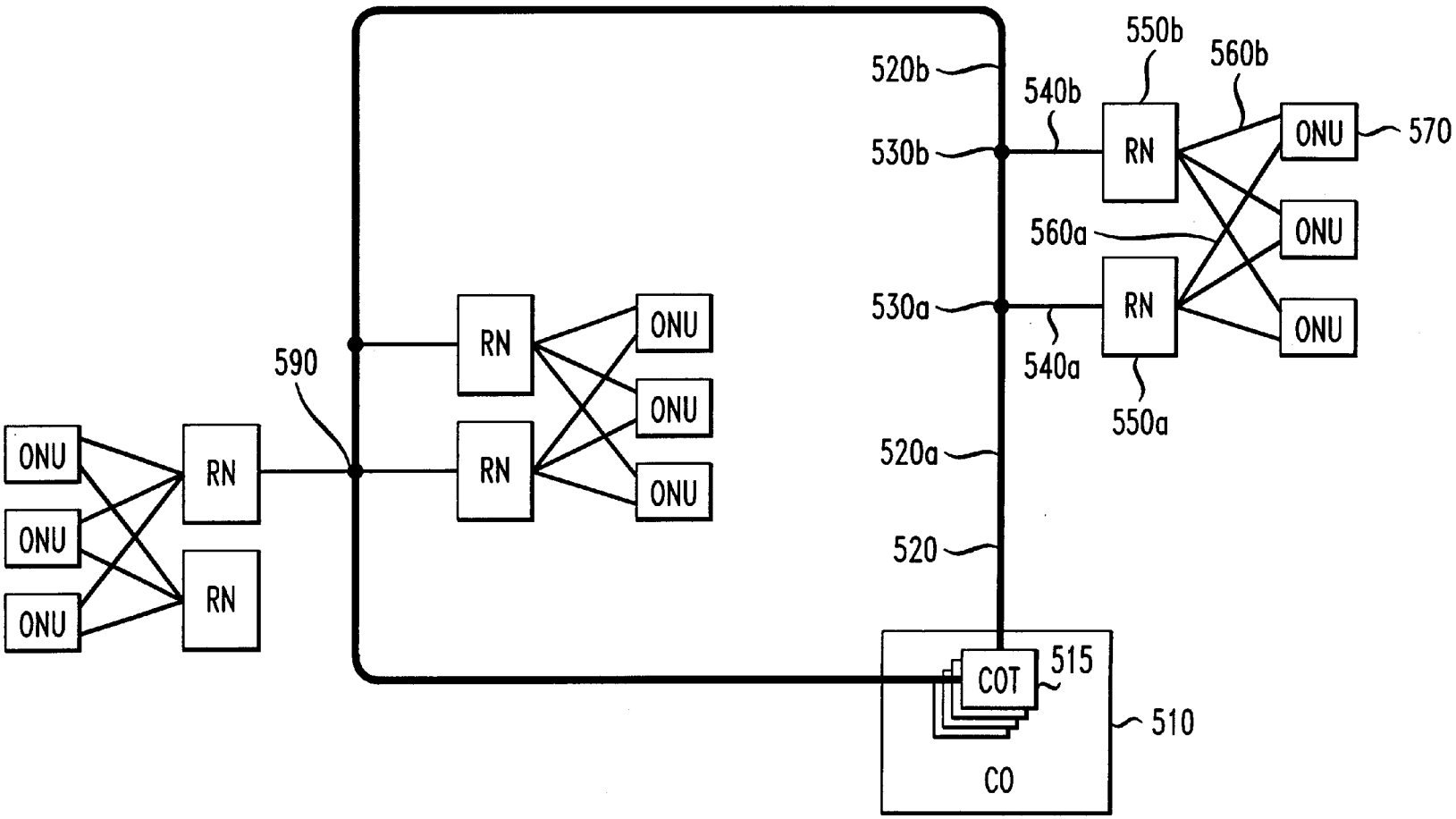
FIG. 5 shows an embodiment of the present invention that provides full-fiber redundancy by using one fiber-optic cable arranged in a ring

FIG. 5 shows an embodiment of the present invention that provides full-fiber redundancy by using one fiber-optic cable 520 arranged in a ring, i.e., having both ends connected to a switching node 510. Switching node 510 may be a CO having one or more COTs 515 connected to fiber-optic cable 520. At a CAP 530*a*, an optical fiber 540*a* is separated from fiber-optic cable 520, and is connected to a RN 550*a*. An ONU 570 is connected to RN 550*a* by an optical fiber 560*a*. Similarly, at CAP 530*b*, an optical fiber 540*b* is separated from fiber-optic cable 520, and is connected to a RN 550*b*. Optical fiber 540*a* is contained by a portion 520*a* of fiber-optic cable 520 between CAP 530*a* and switching node 510 that does not include CAP 530*b*. Similarly, optical fiber 540*b* is contained by a portion 520*b* of fiber-optic cable 520 between CAP 530*b* and switching node 510 that does not include CAP 530*a*, such that there is no overlap between portion 520*a* and portion 520*b*. ONU 570 is connected to RN 550*b* by an optical fiber 560*b*.

The architecture of FIG. 5 includes two independent paths between ONU 570 and switching node 510 via optical fiber. One of these paths runs through optical fiber 560*a*, RN 550*a*, and optical fiber 540*a*, which is contained by portion 520*a* of fiber-optic cable 520. The second path runs through optical fiber 560*b*, RN 550*b*, and optical fiber 540*b*, which is contained by portion 520*b* of fiber-optic cable 520. Similarly, every other ONU in the architecture has two independent paths through optical fiber to switching node 510. As a result, every ONU in the network will have a path through optical fiber to switching node 510, even if an optical fiber or fiber-optic cable is cut anywhere in the local access network.

Preferably, optical fibers 540*a* and 540*b* are cut from a single optical fiber in fiber-optic cable 520. Optical fibers 540*a* and 540*b* are considered separate fibers even where they are cut from what was previously a single optical fiber. Separating optical fiber 540*a* from fiber-optic cable 520 at CAP 530*a* leaves an unused length of fiber running through fiber-optic cable from CAP 530*a* to 530*b* and then to switching node 510. CAPs 530*a* and 530*b* are usually located near each other, such that cutting optical fibers 540*a* and 540*b* from the same optical fiber of fiber-optic cable 520 results in very little "dark," i.e., unused, fiber. However, the relative absence of dark fiber in a cable ring as compared to a linear cable does not necessarily mean that the cable ring uses less optical fiber, because the total length of fiber used between optical fibers 540*a* and 540*b* is about the length of the ring, regardless of where CAPs 530*a* and 530*b* are located, provided that they are located near each other.

Preferably, CAPs 530*a* and 530*b* are located sufficiently far apart that the likelihood of a single event causing a failure at both CAPs is low. However, to reduce installation costs, CAPs 530*a* and 530*b* may be combined into a single CAP, where optical fibers 540*a* and 540*b* are separated from the optical cable at the same CAP, but run in opposite directions through the cable, such that no portion of fiber-optic cable 520 contains both optical fibers 540*a* and 540*b*. However, where such a single CAP is used, a failure at the CAP could result in a loss of service to the N users served by the CAP.

In addition, a single CAP can be used to provide service to different RNs connected to different ONUs, as illustrated at CAP 590 of FIG. 5. This arrangement may not lead to a decrease in reliability, because there may still be a separate, independent path to each RN.

Cable Redundancy, Cable Ring

Figure 6:
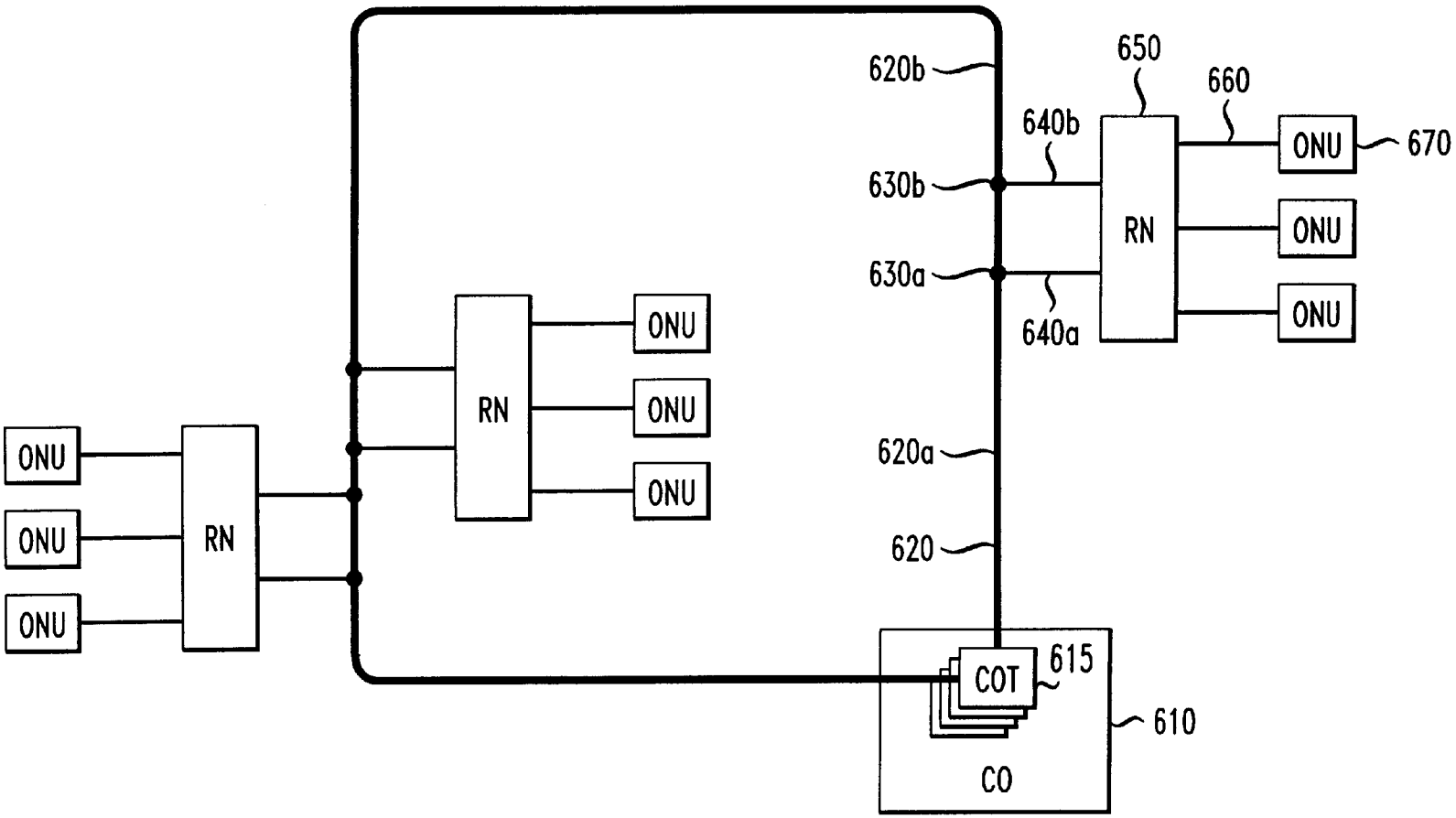
FIG. 6 shows an embodiment of the present invention that provides cable redundancy by using a fiber-optic cable arranged in a ring

FIG. 6 shows an embodiment of the present invention that provides cable redundancy by using a fiber-optic cable 620 arranged in a ring, i.e., having both ends connected to a switching node 610. Switching node 610 may be a CO having one or more COTs 615 connected to fiber-optic cable 620. At a CAP 630*a*, an optical fiber 640*a* is separated from fiber-optic cable 620, and is connected to a RN 650. Optical fiber 640*a* is contained by a portion 620*a* of fiber-optic cable 620 between CAP 630*a* and switching node 610. Similarly, at a CAP 630*b*, an optical fiber 640*b* is separated from fiber-optic cable 620, and is connected to RN 650. Optical fiber 640*b* is contained by a portion 620*b* of fiber-optic cable 620 between CAP 630*b* and switching node 610, such that there is no overlap between portion 620*a* and portion 620*b*. An ONU 670 is connected to RN 650 by an optical fiber 660.

The architecture of FIG. 6 includes two independent paths between switching node 610 and RN 650 via optical fiber. One of these paths runs through optical fiber 640*a*, which is contained by portion 620*a* of fiber-optic cable 620. The second path runs through optical fiber 640*b*, which is contained by portion 620*b* of fiber-optic cable 620. However, there is only a single path from RN 650 to ONU 670, through optical fiber 660. Similarly, there are two independent paths between each RN in the network and switching node 610, but only a single path from each ONU to a RN.

The architecture of FIG. 6 is similar to that of FIG. 4, in that every ONU in the network will have a path through optical fiber to switching node 610, even if an optical fiber or fiber-optic cable is cut between a RN and switching node 610. A cut in an optical fiber between a RN and an ONU will interrupt service, but only to a single ONU. However, if a failure occurs in a RN, service might be interrupted to the N ONUs connected to the RN. In addition, to reduce the costs of installation, the connections between a RN and the two cable portions 620*a* and 620*b* may not be independent, and/or the connections between a RN and the ONUs connected to the RN may not be independent. In this situation, the failure group size might be as large as the N ONUs connected to a RN.

The discussions of dark fiber and shared CAPs with respect to the embodiment of FIG. 5 also applies to the embodiment of FIG. 6.

Hybrid Full-Fiber and Cable-Redundant Architectures

Elements from each of the above architectures may be combined in a variety of ways. For example, an architecture having two separate fiber-optic cables can provide some ONUs with full-fiber redundancy, as shown in FIG. 3, and other ONUs with cable redundancy, as shown in FIG. 4. Similarly, a ring architecture can provide some ONUs with full-fiber redundancy, as shown in FIG. 5, and other ONUs with cable redundancy, as shown in FIG. 6. Such combinations would be useful, for example, when some ONUs serve businesses that require greater reliability and are willing to pay for it, while other ONUs serve private residences, where reduced installation cost may be more important than the reliability provided by full-fiber redundancy.

Branches and Hybrid Ring/Two Cable Architectures

Figure 7:
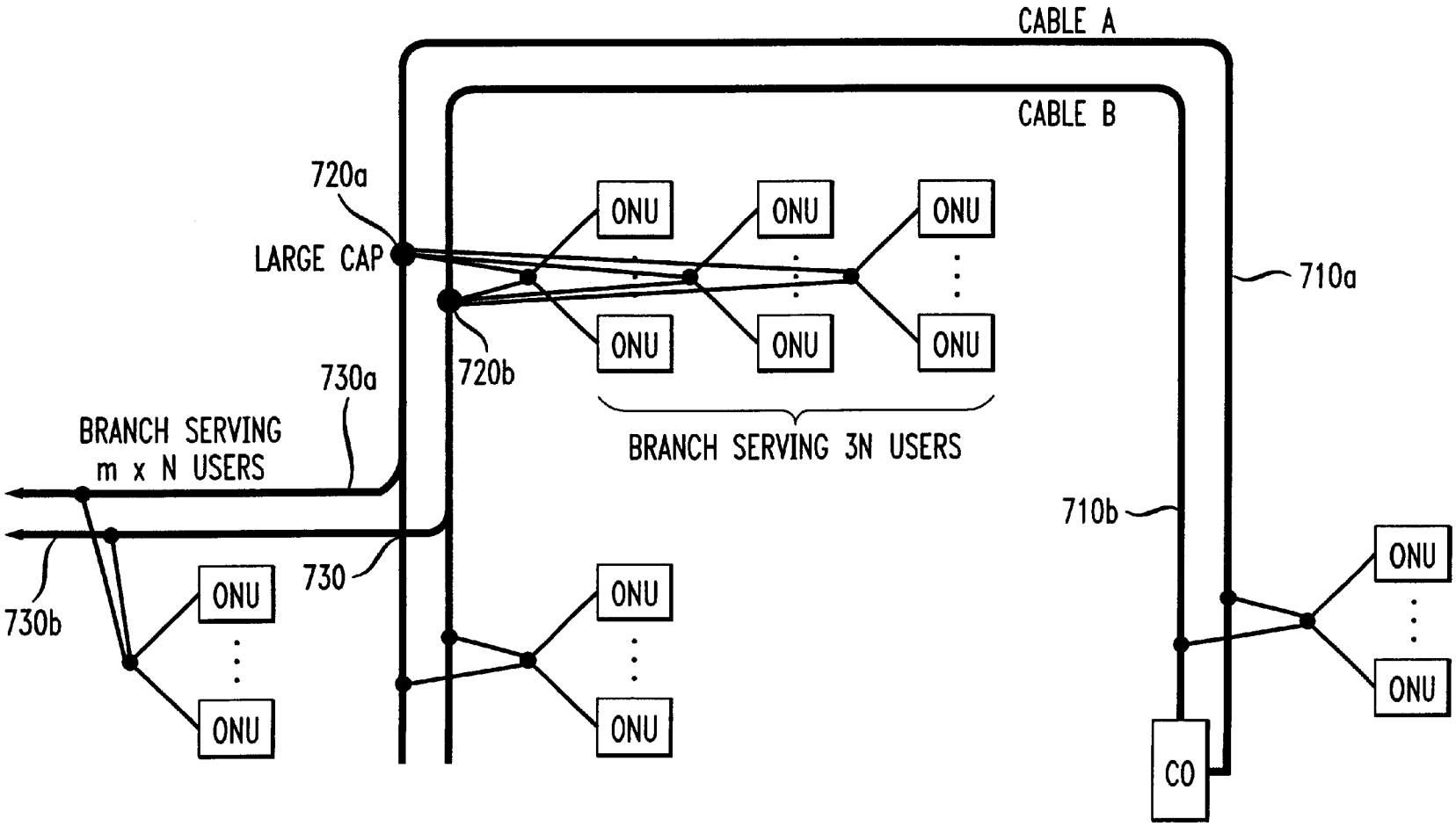
FIG. 7 shows a network architecture having branches.

FIGS. 3, 4, 5 and 6 show network architectures where single optical fibers leave a primary cable, which does not have any branches, to serve a small number of users. However, in a realistic system, the primary cable may have many branches, each branch containing many fibers. FIG. 7 shows a network architecture similar to that of FIG. 3, but the primary fiber-optic cables 710*a* and 710*b* have two types of branches: (1) large CAPs 720*a* and 720*b*, respectively, and (2) a fiber-optic cable branch having fiber-optic cables 730*a* and 730*b*. Large CAPs 720*a* and 720*b* are similar to CAPs 330*a* and 330*b* of FIG. 3, but many fibers leave CAPs 720*a* and 720*b* to serve a number of ONUs too large to be served by a single fiber from each CAP. Similarly, at branch 730, a large number of optical fibers are separated from primary fiber-optic cables, so many that the separated fibers form their own fiber-optic cables 730*a* and 730*b*. Whether a group of fibers separated from a primary fiber-optic cable should be treated as a branch cable or as a group of fibers which share a large CAP depends on whether the number of ONUs served by the separated fibers is a tolerable failure group size. If the number of ONUs served is greater then the allowable failure group size, then the separated optical fibers should be treated as a cable, particularly in a cable-redundant architecture without full-fiber protection. If not, then the branch joins the primary cable at a large CAP, and the failure group size is approximately the number of fibers in the branch times N.

Figure 8:
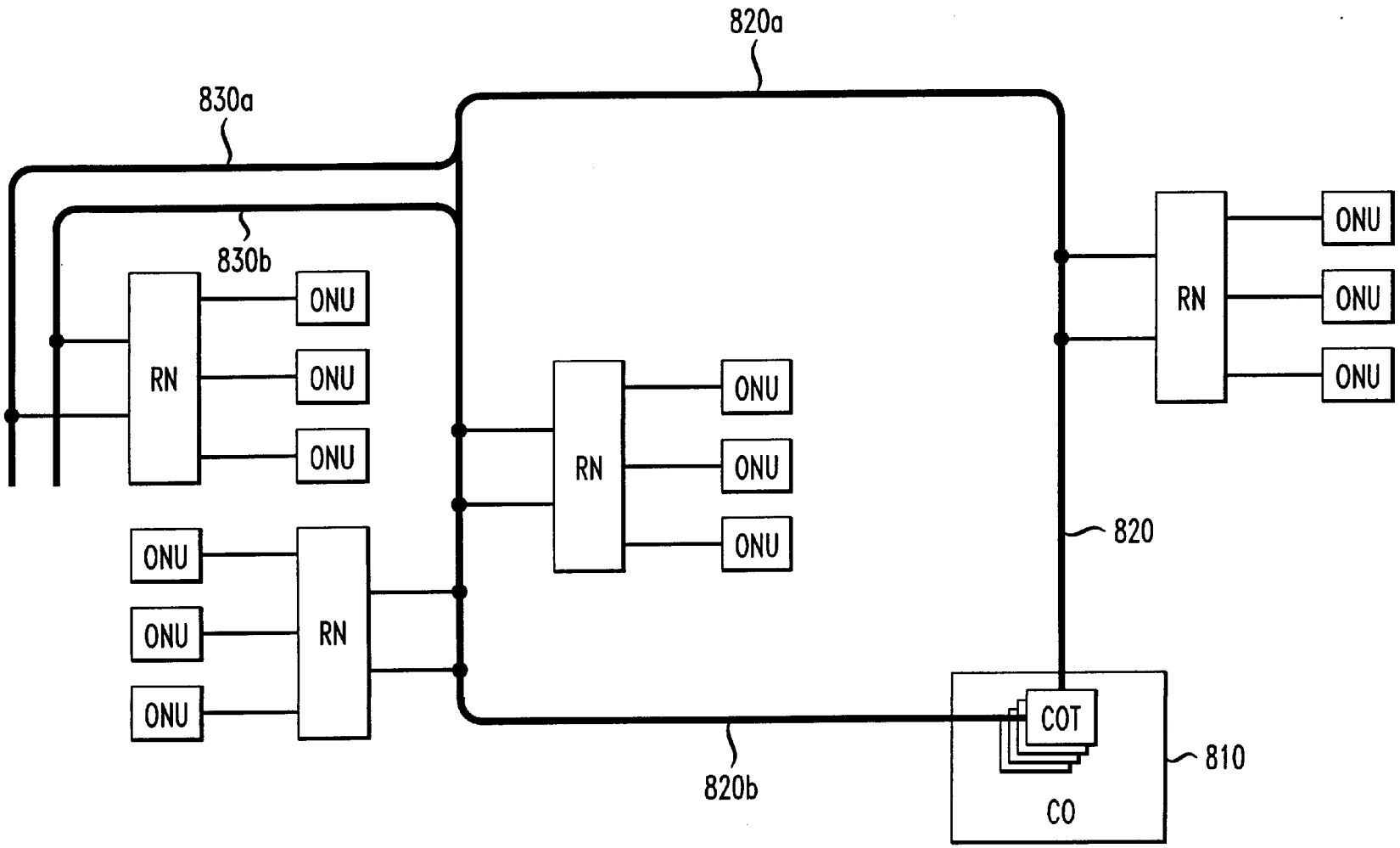
FIG. 8 shows a local access network architecture having a fiber-optic cable branch having two fiber-optic cables, branched from a cable ring.

In addition, the ring architectures of FIGS. 5 and 6 may be combined with the two cable architectures of FIGS. 3 and 4. For example, a fiber-optic cable branch having two fiber-optic cables may be separated from a cable ring. FIG. 8 shows such an architecture. A switching node 810 is connected to both ends of a fiber-optic cable 820 to form a ring. Fiber-optic cables 830*a* and 830*b* form a branch from fiber-optic cable 820. Fiber-optic cable 830*a* is comprised of optical fibers that run through a portion 820*a* of fiber-optic cable 820, and fiber-optic cable 830*b* is comprised of optical fibers that run through a portion 820*b* of fiber-optic cable 820. Optical fibers may be separated from fiber-optic cable 820 to serve ONUs in a manner similar to that shown by FIGS. 5 and/or 6, and optical fibers may be separated from fiber-optic cables 830*a* and 830*b* to serve ONUs in a manner similar to that shown by FIGS. 3 and/or 4.

Optical Network Units for Use With Star Coupler Remote Nodes

A number of different ONU configurations may be used to implement the local access network architectures of the present invention. Useful ONU configurations include ONUs adapted to receive and transmit via a single fiber, ONUs adapted to receive via one fiber and transmit via another, ONUs connected to two fibers and adapted to receive via either one of these fibers at any given time and to transmit via both fibers at the same time, ONUs connected to four fibers and adapted to receive via one of two fibers at any given time and to transmit via the other two at the same time, and ONUs connected to four fibers and adapted to switch between two fibers for receiving and to switch between the other two for transmission, as well as other configurations. FIGS. 9 through 13 show examples of such ONUs, and in particular show ONUs that may be used in a PON having RNs that are optical star couplers.

Figure 9:
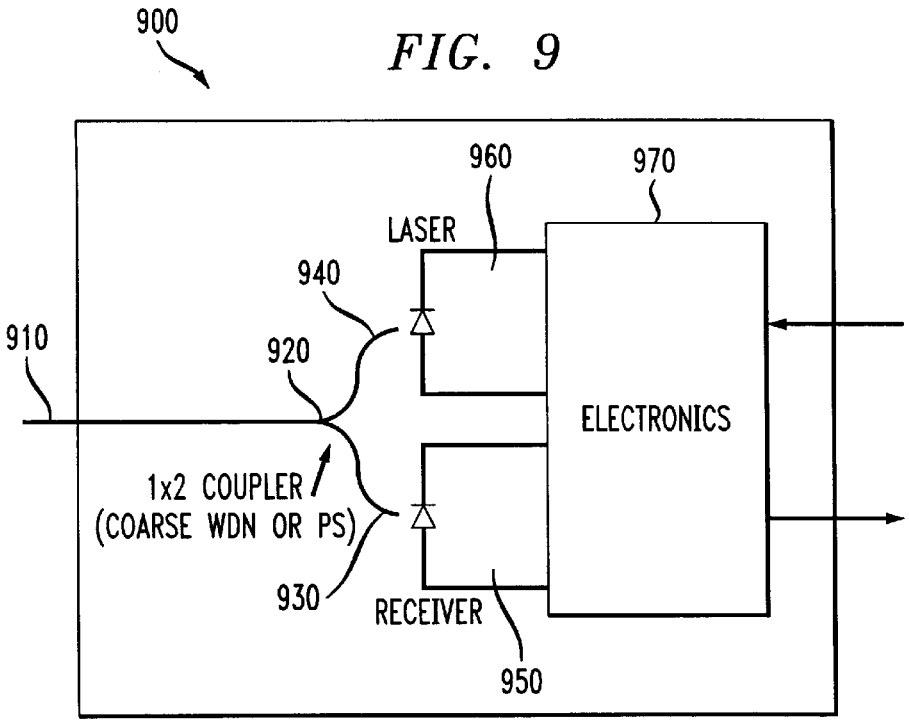
FIG. 9 shows an optical network unit adapted to receive and transmit via a single fiber

FIG. 9 shows an ONU 900 adapted to receive and transmit via a single fiber 910. ONU 900 is adapted for use, for example, in a local access network architecture that does not provide redundancy, such as the network of FIG. 1, or one that provides cable redundancy but not full-fiber protection, such as the networks of FIGS. 4, and 6. Optical fiber 910 is analogous to optical fiber 160, 460 and 660 of FIGS. 1, 4, and 6, respectively.

Optical fiber 910 is connected to an optical coupler 920. Optical fiber 930 connects optical coupler 920 to receiver 950, and optical fiber 940 connects optical coupler 920 to laser 960. Receiver 950 and laser 960 are also connected to electronics 970, which are in turn connected to CPE (not shown). Coupler 920, optical fibers 930 and 940, receiver 950 and laser 960 could be replaced with an integrated bidirectional module, as is well-known in the existing art.

Optical coupler 920 is a 1×2 optical coupler, adapted to split an optical signal from the CO via optical fiber 910 into two signals, one for transmission to receiver 950 via optical fiber 930, and one for transmission to laser 960 via optical fiber 940. However, because laser 960 is not adapted to receive optical signals, the signal sent through optical fiber 940 is ignored. Optical coupler 920 is also adapted to combine two optical signals, one from receiver 950 via optical fiber 930 and another from laser 960 via optical fiber 940, into a single signal for the CO via optical fiber 910. However, because optical receiver 950 does not send optical signals, the combined signal will essentially be the signal received from laser 960. Receiver 950 is adapted to receive optical signals from optical fiber 930, and to convert these optical signals into electronic signals for transmission to electronics 970. Laser 960 is adapted to receive electronic signals from electronics 970, and to convert these electronic signals into optical signals for transmission via optical fiber 940. Electronics 970 are also connected to CPE (not shown).

Figure 10:
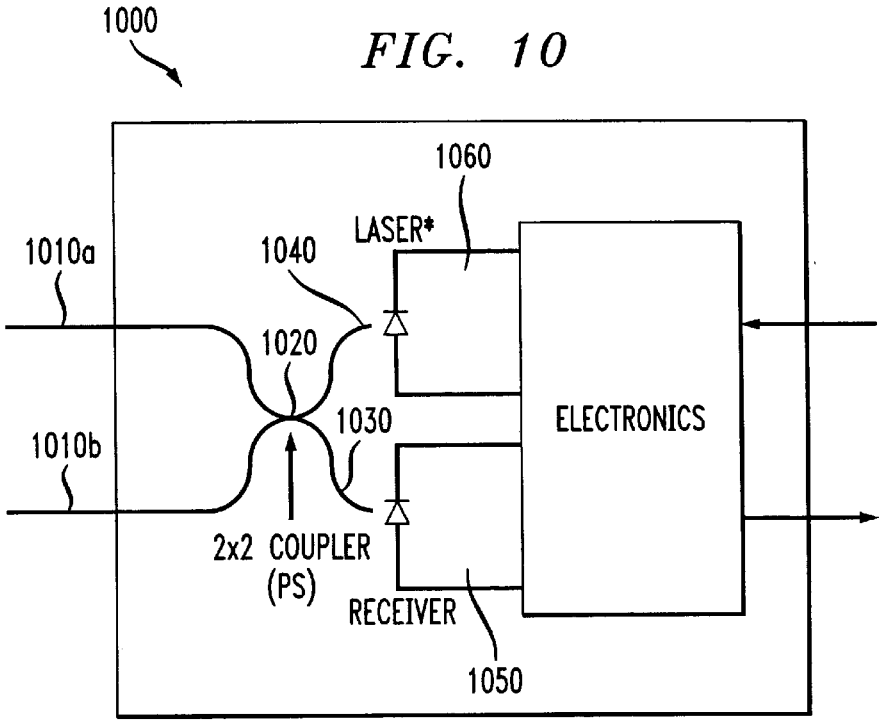
FIG. 10 shows an optical network unit adapted to receive signals at any given time via one of two alternate optical fibers, and to transmit signals via both of these fibers at the same time.

FIG. 10 shows an ONU 1000 adapted to receive signals at any given time via one of two alternate optical fibers 1010*a* and 1010*b*, and to transmit signals via both of these fibers at the same time. Except as described, ONU 1000 is similar to ONU 900. ONU 1000 is adapted for use, for example, in a local access network that provides full-fiber protection, such as the networks of FIGS. 3 and 5, where optical fibers 1010*a* and 1010*b* are analogous to optical fibers 360*a* and 360*b* of FIG. 3, or optical fibers 560*a* and 560*b* of FIG. 5.

Optical fibers 1010*a* and 1010*b* are connected to an optical coupler 1020. Optical coupler 1020 is a 2×2 optical coupler, adapted to combine two optical signals, one from optical fiber 1010*a* and one from optical fiber 1010*b*, and to split the combined signal into two identical optical signals for transmission to receiver 1050 via optical fiber 1030 and to laser 1060 via optical fiber 1040. However, laser 1060 ignores signals received via optical fiber 1040. Optical coupler 1020 is also adapted to combine two optical signals, one from receiver 1050 via optical fiber 1030, and another from laser 1060 via optical fiber 1040, into a combined signal, and to split the combined signal into two identical optical signals for transmission through optical fibers 1010*a* and 1010*b*. However, receiver 1050 does not transmit signals, so the "combined" signal is effectively a signal from laser 1060.

Receiver 1050 receives signals from optical fibers 1010*a* and 1010*b* simultaneously. To avoid interference between signals, ONU 1000 is preferably used with a COT adapted to send a signal to ONU 1000 at any given time through either optical fiber 1010*a* or optical fiber 1010*b*, but not both, using a switch or similar device. Also, ONU 1000 sends identical signals to the COT through both optical fibers 1010*a* and 1010*b*. To avoid interference between signals, the COT is preferably adapted to receive only one set of these signals at any given time, using a switch or similar device.

Figure 11:
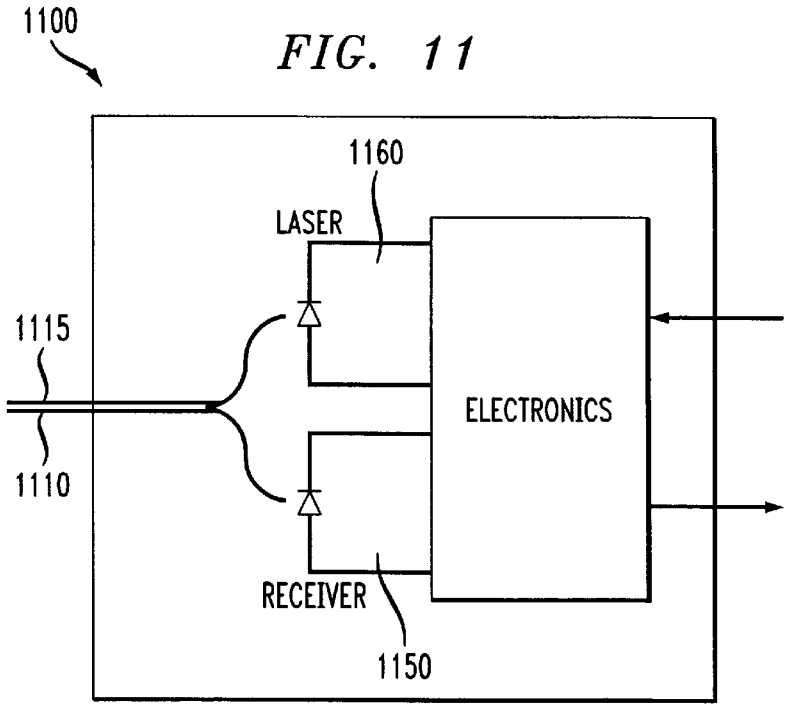
FIG. 11 shows an optical network unit adapted to receive signals via an optical fiber, and to transmit optical signals via another optical fiber.

FIG. 11 shows an ONU 1100 adapted to receive signals via optical fiber 1110, and to transmit optical signals via optical fiber 1115. Except as described, ONU 1100 is similar to ONU 900. ONU 1100 is adapted for use, for example, in a local access network architecture that does not provide redundancy, such as the network of FIG. 1, or one that provides cable redundancy but not full-fiber protection, such as the networks of FIGS. 4, and 6, where RN 150 may comprise two optical star couplers, one WGR, two WGRs, or other components having a similar ability to accommodate separate fibers for transmissions in each direction, and where RN 150 is connected to ONU 170 and COT 115 by two optical fibers each. Optical fiber 1110 is analogous to optical fibers 160, 460 and 660 of FIGS. 1, 4, and 6, respectively. The fiber to which optical fiber 1115 is analogous is not shown in FIGS. 1, 4, and 6, but runs parallel to optical fibers 160, 460 and 660, i.e., optical fibers 160, 460, and 660 each represent two optical fibers.

An optical fiber 1110 is coupled to a receiver 1150 which is adapted to receive optical signals from the CO via optical fiber 1140. An optical fiber 1115 is coupled to a laser 1160, which is adapted to transmit optical signals to the CO via optical fiber 1115.

Figure 12:
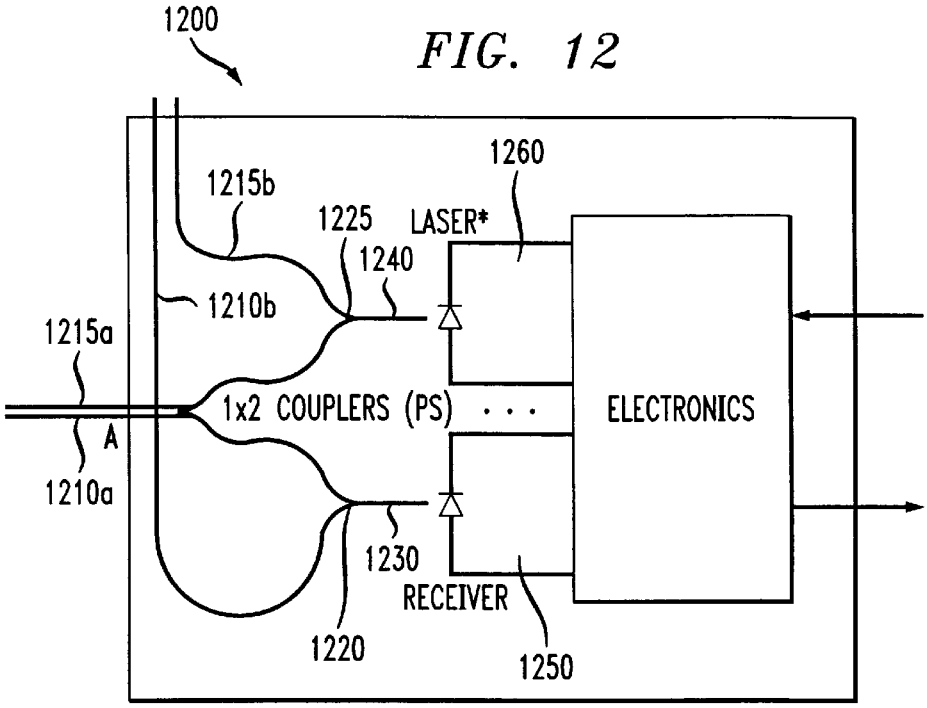
FIG. 12 shows an optical network unit adapted to receive via one of two optical fibers at any given time, and to transmit via two other optical fibers at the same time.

FIG. 12 shows an ONU 1200 adapted to receive via one of optical fibers 1210*a* or 1210*b* at any given time, and to transmit via optical fibers 1215*a* and 1215*b* at the same time. Except as described, ONU 1200 is similar to ONU 1100. ONU 1200 is adapted for use, for example, in a local access network that provides full-fiber protection, such as the networks of FIGS. 3 and 5, where RN 350 and RN 550 may comprise two optical star couplers, one WGR, two WGRs, or other components having a similar ability to accommodate separate fibers for transmissions in each direction, and where RNs 350 and 550 are connected to ONUs 370 and 570 by two optical fibers, and to COTs 315 and 515 by two optical fibers, respectively, to accommodate separate fibers for transmissions in each direction. Optical fibers 1210*a* and 1210*b* are analogous to optical fibers 360*a* and 360*b* of FIG. 3, or optical fibers 560*a* and 560*b* of FIG. 5. The fibers to which optical fibers 1215*a* and 1215*b* are analogous are not shown in FIGS. 3 and 5, but run parallel to optical fibers 360*a* and 360*b* of FIG. 3, and 560*a* and 560*b* of FIG. 5, respectively, i.e., optical fibers 360*a*, 360*b*, 560*a*, and 560*b* each represent two optical fibers.

Optical fibers 1210*a* and 1210*b* are connected to an optical coupler 1220. Optical coupler 1220 is a 1×2 optical coupler, adapted to combine two optical signals from the COT via optical fibers 1210*a* and 1210*b* into a single signal for transmission to receiver 1250 via optical fiber 1230. Optical coupler 1225 is adapted to split an optical signal from laser 1260 via optical fiber 1240 into two identical optical signals, for transmission to the COT via optical fibers 1215*a* and 1215*b*, respectively.

ONU 1200 is adapted to receive signals simultaneously via two separate optical fibers 1210*a* and 1210*b*, and to transmit signals simultaneously via two separate fibers 1215*a* and 1215*b*. As with ONU 1000, it is preferable to avoid interference between these signals. ONU 1200 is therefore preferably used with a COT adapted to send a signal to ONU 1200 at any given time through either optical fiber 1210*a* or optical fiber 1210*b*, but not both, using a switch or similar device. Also, the COT is preferably adapted to receive signals via optical fiber 1215*a* or 1215*b*, but not both, at any given time, using a switch or similar device.

Optical couplers, such as optical coupler 1225, that split a signal may cause a loss of signal, usually about 3 dB. However, this loss can be at least partially compensated by using lasers that are tightly coupled to the optical fiber. Unisolated lasers are typically intentionally decoupled from the fiber pigtail to reduce the laser's sensitivity to back reflections. This decoupling causes some loss of signal. However, if the laser is immediately followed by a 3 dB coupler, the coupler will reduce the amount of light reflected back into the laser. As a result, the laser can be tightly coupled to the fiber. For example, laser 1260 may be tightly coupled to optical fiber 1240 to compensate for the loss of signal caused by optical coupler 1225, and optical coupler 1225 may reduce the amount of light reflected back into the laser, such that the tight coupling does not have an adverse effect.

Also, loss of signal may be compensated for by using a higher power laser. Higher power lasers may be more cost effective for use in a COT, where the cost of a laser in a broadcast PON is shared among N users, and the increased cost per home served may be slight.

Figure 13:
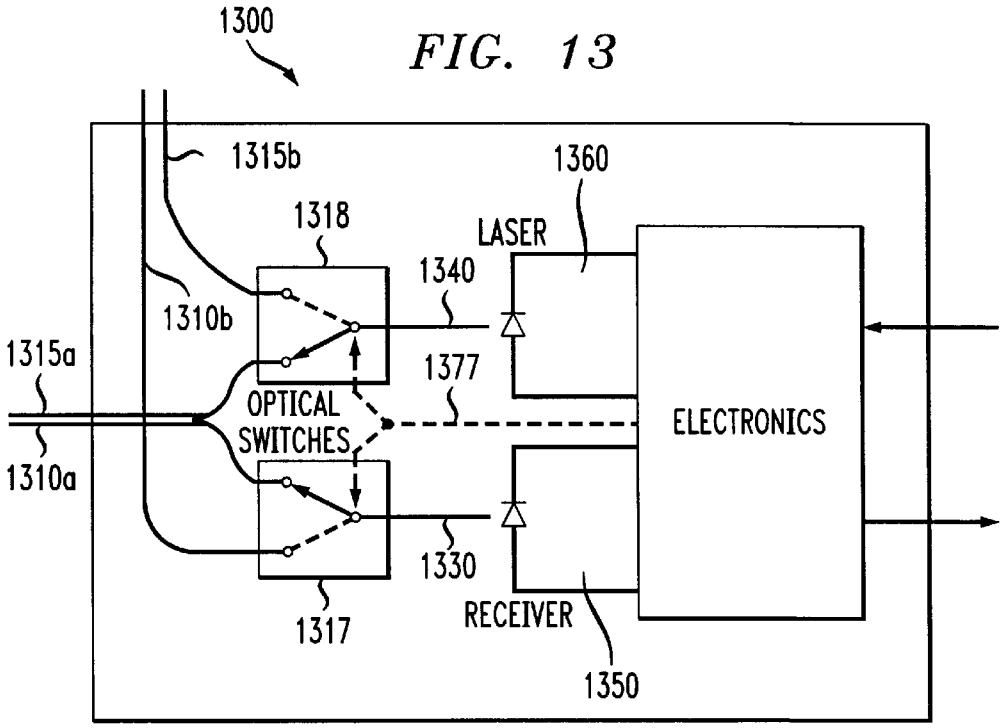
FIG. 13 shows an optical network unit adapted to switch between two optical fibers for receiving, and to switch between two other optical fibers for transmission.

FIG. 13 shows an ONU 1300 adapted to switch between optical fibers 1310*a* and 1310*b* for receiving, and to switch between optical fibers 1315*a* and 1315*b* for transmission. Except as described, ONU 1300 is similar to ONU 1200. ONU 1300 is adapted for use, for example, in a local access network that provides full-fiber protection, such as the networks of FIGS. 3 and 5, and adapted to accommodate separate fibers for transmissions in each direction. Optical fibers 1310*a* and 1310*b* are similar to optical fibers 1210*a* and 1210*b* of FIG. 12 in terms of analogies to FIGS. 3 and 5.

Optical fibers 1310*a* and 1310*b* are connected to an optical switch 1317. Optical switch 1317 is adapted to select either optical fiber 1310*a* or optical fiber 1310*b*, and to connect the selected optical fiber to receiver 1350 via optical fiber 1330, such that signals from the selected optical fiber are sent to receiver 1350 via optical fiber 1330. Signals from the optical fiber not selected are not sent to receiver 1350. As a result, receiver 1350 receives signals from only one of optical fibers 1310*a* and 1310*b* at any given time, and the COT may transmit identical signals to ONU 1300 via optical fibers 1310*a* and 1310*b* without interference.

Optical fibers 1315*a* and 1315*b* are connected to an optical switch 1318. Optical switch 1318 is adapted to select either optical fiber 1315*a* or optical fiber 1315*b*, and to connect the selected optical fiber to laser 1360 via optical fiber 1340, such that signals from laser 1360 are transmitted to the COT via the selected optical fiber, but not transmitted via the optical fiber not selected. As a result, laser 1360 transmits signals via only one of optical fibers 1315*a* and 1315*b* at any given time.

Electronics 1370 are adapted to detect a failure in the connection between ONU 1300 and the COT that includes the optical fiber selected by optical switch 1317. For example, the COT could send a predetermined signal to ONU 1300 at regular intervals. If these signals are not received for a period of time, electronics 1370 would presume that a failure has occurred. If a failure is detected, electronics 1370 send a signal to optical switch 1317 via connection 1377, directing optical switch 1317 to select the other optical fiber. Electronics 1370 also transmit an error message to the COT in the event of an error, so that appropriate repair measures may be taken. Similarly, electronics 1370 are adapted to detect a failure in the connection between ONU 1300 and the COT that includes the optical fiber selected by optical switch 1318. In the event of such an error, electronics 1370 are adapted to send a signal via connection 1377, directing optical switch 1318 to select the other optical fiber. Also, an error message may be transmitted to the COT.

Preferably, optical switches 1317 and 1318 are controlled in a coordinated manner, such that optical fibers 1310*a* and 1315*a* are paired, and optical fibers 1310*b* and 1315*b* are paired, and fibers in a pair are selected at the same time. Fibers in the same pair are ultimately connected to fibers contained by the same portion of fiber-optic cable, whereas fibers in different pairs are not. As a result, a single event that damages a fiber-optic cable may result in the simultaneous failure of communication along both fibers in a pair, whereas simultaneous failures of communication along fibers from different pairs is much less likely.

Because ONU 1300 has a switching capability, it may be used with a COT adapted to send identical signals to ONU 1300 through optical fibers 1310*a* and 1310*b* at the same time. Also, the ONU sends signals to the COT at any given time through only one of optical fibers 1315*a* and 1315*b*, which may simplify processing at the COT. In addition, switches do not have the losses associated with optical couplers. However, these advantages are not without cost. In order to effectively use the switches, the ONU should have the capability to detect failures, which requires processing power at the ONU. The switches may also require power and maintenance. Nevertheless, such switching is not catastrophic as the outside plant is still purely passive, although it is preferable to avoid switching at the ONU.

Central Office Transceivers for Use With Star Coupler Remote Nodes

A number of different COT configurations may be used to implement the local access network architectures of the present invention. Useful COT configurations include COTs adapted to receive and transmit via a single fiber; COTs adapted to send and receive at any given time via a single fiber, and to switch between two such fibers; COTs adapted to send via one fiber and receive via another; and COTs connected to two pairs of fibers, and adapted at any given time to transmit via one fiber of a pair and receive via the other fiber of a pair, and to switch between pairs, as well as other configurations. FIGS. 14 through 17 show COTs adapted for use with a PON having RNs that use optical star couplers.

Figure 14:
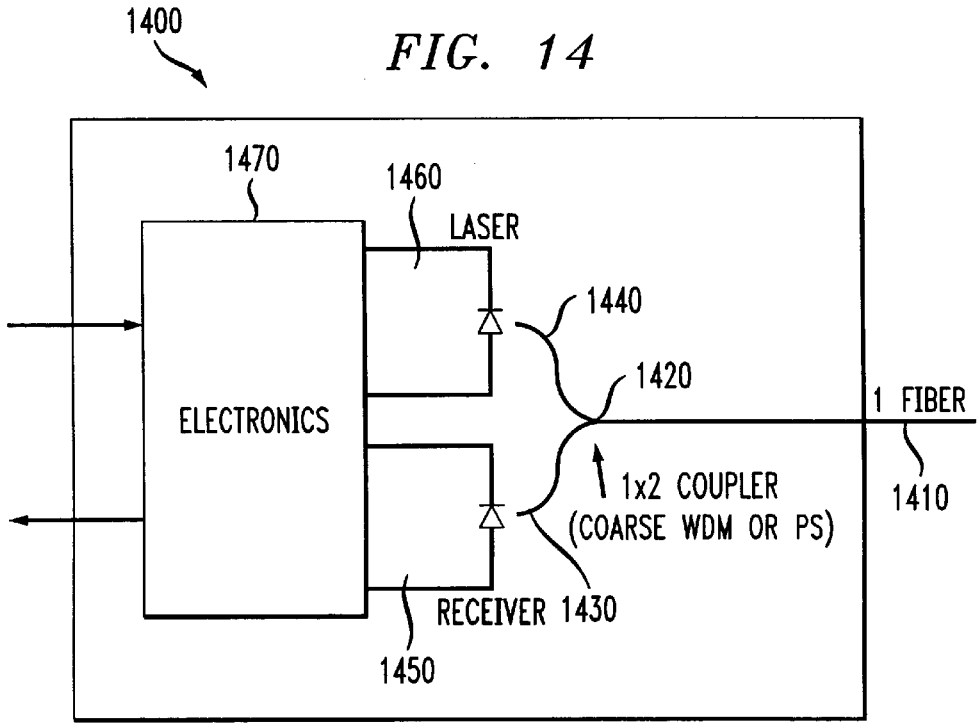
FIG. 14 shows a central office transceiver adapted to receive and transmit via a single fiber.

FIG. 14 shows a COT 1400 adapted to receive and transmit via a single fiber 1410. COT 1400 is adapted for use, for example, in a local access network architecture that does not provide redundancy, such as the network of FIG. 1, in which case optical fiber 1410 is analogous to optical fiber 140 of FIG. 1. COT 1400 may also be adapted for use in a network that provides cable-redundant and/or full-fiber protection through the use of a 1×2 optical coupler (not shown) connected to optical fiber 1410, provided that the ONUs in the network have switching or equivalent capabilities.

Optical fiber 1410 is connected to an optical coupler 1420. Optical fiber 1430 connects optical coupler 1420 to receiver 1450, and optical fiber 1440 connects optical coupler 1420 to laser 1460. Receiver 1450 and laser 1460 are also connected to electronics 1470, which are adapted to communicate with the CO of which COT 1400 is apart.

Optical coupler 1420 is a 1×2 optical coupler, adapted to split an optical signal from the ONU via optical fiber 1410 into two signals, one for transmission to receiver 1450 via optical fiber 1430, and one for transmission to laser 1460 via optical fiber 1440. However, because laser 1460 is not adapted to receive optical signals, the signal sent through optical fiber 1440 is ignored. Optical coupler 1420 is also adapted to combine two optical signals, one from receiver 1450 via optical fiber 1430 and another from laser 1460 via optical fiber 1440, into a single signal for the ONU via optical fiber 1410. However, because optical receiver 1450 does not send optical signals; the combined signal will essentially be the signal received from laser 1460. Receiver 1450 is adapted to receive optical signals from optical fiber 1430, convert these optical signals into electronic signals, and transmit the electronic signals to electronics 1470. Laser 1460 is adapted to receive electronic signals from electronics 1470, convert these electronic signals into optical signals, and transmit the optical signals along optical fiber 1440. Electronics 1470 are adapted to transmit electronic signals between receiver 1450, laser 1460, and the CO of which COT 1400 is a part.

Figure 15:
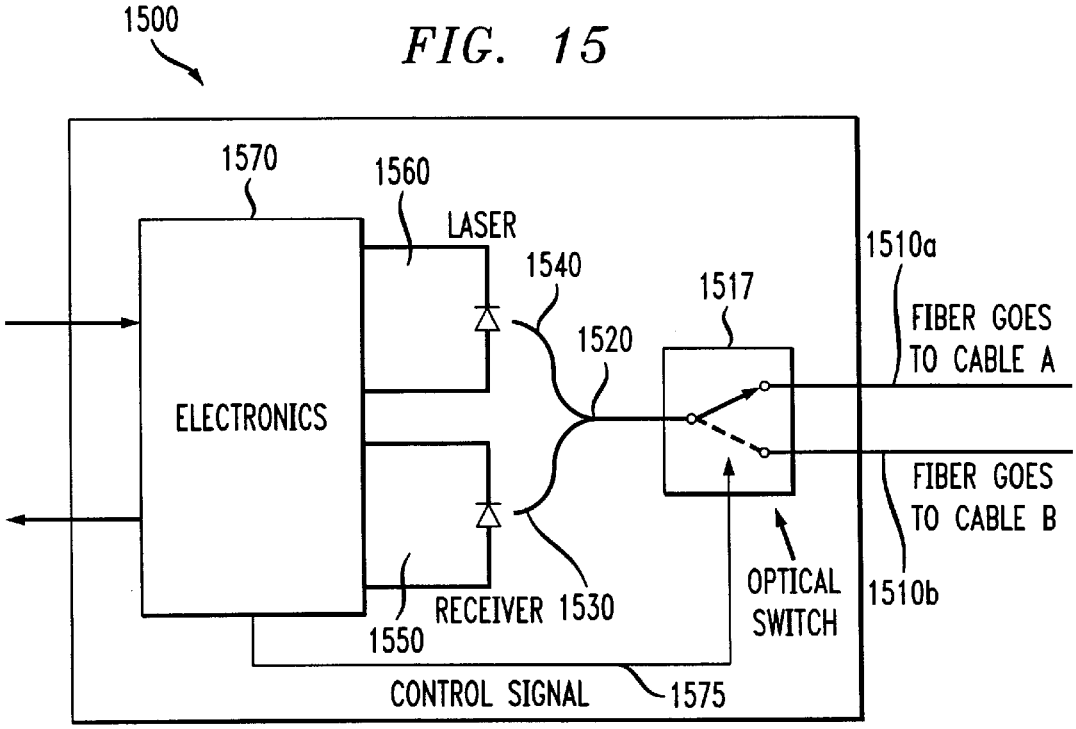
FIG. 15 shows a central office transceiver adapted to send and receive at any given time via a single optical fiber selected from two optical fibers, and to switch between the two fibers.

FIG. 15 shows a COT 1500 adapted to send and receive at any given time via a single optical fiber selected from optical fibers 1510*a* and 1510*b*, and to switch between the two fibers. Except as described, COT 1500 is similar to COT 1400. COT 1500 is adapted for use in a network that provides cable-redundant protection and/or full-fiber protection, such as the networks of FIGS. 3, 4, 5, and 6, where optical fibers 1510*a* and 1510*b* are analogous to optical fibers 340*a* and 340*b* of FIG. 3, 440*a* and 440*b* of FIG. 4, 540*a* and 540*b* of FIG. 5, and 640*a* and 640*b* of FIG. 6.

Optical fibers 1510*a* and 1510*b* are connected to an optical switch 1517. Optical switch 1517 is adapted to select either optical fiber 1510*a* or optical fiber 1510*b*, and to connect the selected optical fiber to optical coupler 1520. Signals from the selected optical fiber are sent to optical coupler 1520, and signals from optical coupler 1520 are sent to an ONU via the selected optical fiber. Optical switch 1517 does not transmit or receive signals via the optical fiber not selected. As a result, COT 1500 is adapted to send a signal to an ONU at any given time through either optical fiber 1510*a* or optical fiber 1510*b*, but not both. Also, COT 1500 is adapted to respond to only one set of signals from an ONU, even if the ONU sends redundant signals via optical fibers 1510*a* and 1510*b*.

Electronics 1570 are also adapted to detect a failure in the connection between COT 1500 and an ONU that includes the optical fiber selected by optical switch 1517. For example, COT 1500 could poll the ONU at regular intervals. If a failure is detected, electronics 1570 send a signal to optical switch 1517 via connection 1575, directing optical switch 1517 to select the other optical fiber. Electronics 1570 also generate an error message in the event of an error, so that appropriate repair measures may be taken.

Figure 16:
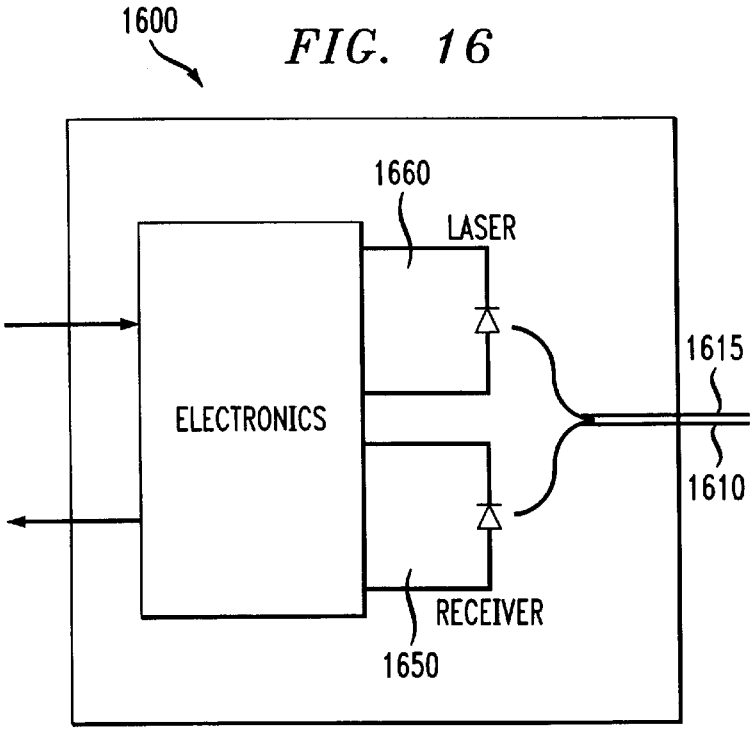
FIG. 16 shows a central office transceiver adapted to send via an optical fiber and receive via another optical fiber.

FIG. 16 shows a COT 1600 adapted to receive via optical fiber 1610 and send via optical fiber 1615. COT 1600 is adapted for use, for example, in a local access network architecture that does not provide redundancy, such as the network of FIG. 1, but having two optical fibers and two RNs for each one shown in FIG. 1, to accommodate separate fibers for transmissions in each direction. Optical fiber 1610 is analogous to optical fiber 140 of FIG. 1, and optical fiber 1615 is analogous to a fiber running parallel to optical fiber 140, i.e., optical fiber 140 represents two optical fibers. COT 1600 may also be adapted for use in a network that provides cable-redundant and/or full-fiber protection through the use of 1×2 optical couplers (not shown) connected to optical fibers 1610 and 1615, provided that the ONUs in the network have switching or equivalent capabilities.

An optical fiber 1610 is coupled to a receiver 1650, which is adapted to receive optical signals from the ONU via optical fiber 1610. An optical fiber 1615 is coupled to a laser 1660, which is adapted to transmit optical signals to the ONU via optical fiber 1615.

Figure 17:
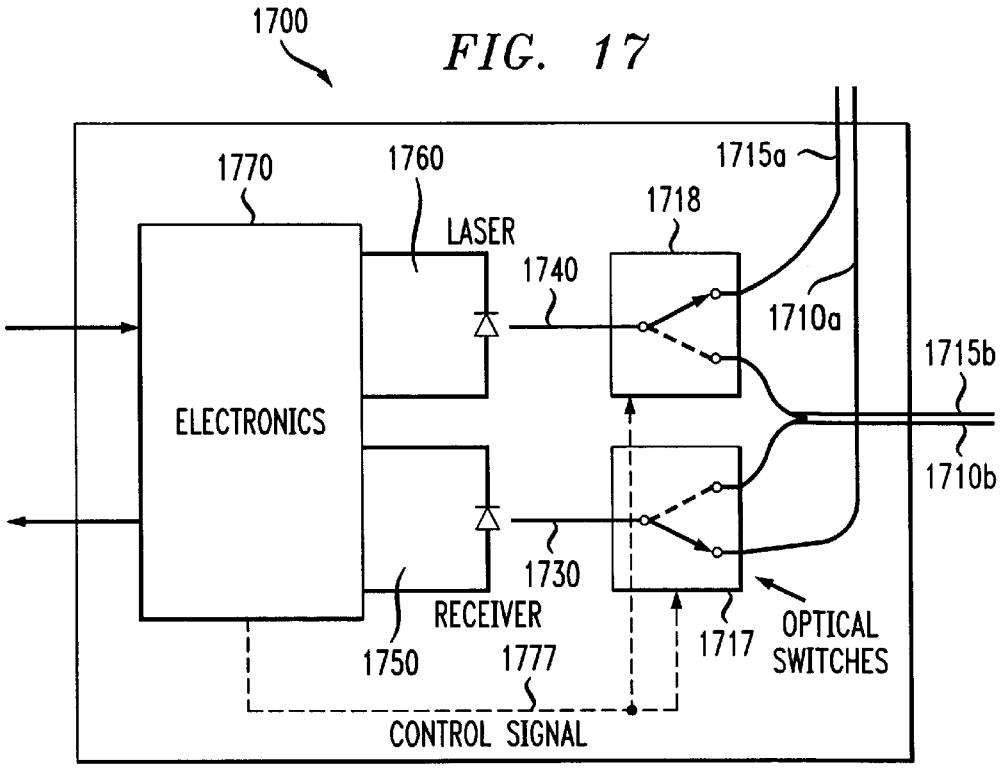
FIG. 17 shows a central office transceiver adapted to, at any given time, transmit via a first optical fiber and receive via a second optical fiber, or to transmit via a third optical fiber and receive via a fourth optical fiber, and to switch between the two states.

FIG. 17 shows a COT 1700 adapted to, at any given time, receive via optical fiber 1710*a* and transmit via optical fiber 1715*a,* or to receive via optical fiber 171*b* and transmit via optical fiber 1715*b,* and to switch between the two states. COT 1700 is adapted for use in a network that provides cable-redundant protection and/or full-fiber protection, such as the networks of FIGS. 3, 4, 5, and 6, adapted to accommodate separate fibers for transmissions in each direction. Optical fibers 1710*a* and 1710*b* are analogous to optical fibers 340*a* and 340*b* of FIG. 3, 440*a* and 440*b* of FIG. 4, 540*a* and 540*b* of FIG. 5, and 640*a* and 640*b* of FIG. 6. The fibers to which optical fibers 1715*a* and 1715*b* are analogous are not shown, but run parallel to optical fibers 340*a* and 340*b* of FIG. 3, and 540*a* and 540*b* of FIG. 5, respectively, i.e., optical fibers 340*a,* 340*b,* 540*a,* and 540*b* each represent two optical fibers.

Optical fibers 1710*a,* 1710*b,* 1715*a,* 1715*b,* 1730 and 1740, optical switches 1717 and 1718, receiver 1750, laser 1760, electronics 1770, and connection 1777 are connected and operated in a manner similar to optical fibers 1310*a*, 1310*b*, 1315*a,* 1315*b,* 1330 and 1340, optical switches 1317 and 1318, receiver 1350, laser 1360, electronics 1370, and connection 1377 of FIG. 13, except in the context of a COT instead of an ONU.

Optical Network Units for Use With Wavelength Grating Router Remote Nodes

A PON may use wavelength grating routers (WGRs) as RNs instead of star couplers. Such a PON may be referred to as a wavelength-division-multiplexed (WDM) PON. The use of WGRs advantageously allows multiple signals having different wavelengths to be combined for transmission along a single fiber to a RN that is a WGR, which is adapted to separate the signals based on wavelength for further transmission to individual ONUs via separate optical fibers. The WDM-PON advantageously allows separate point-to-point communication between a CO and individual ONUs connected to a RN, without requiring a separate fiber or fiber pair for each ONU between the CO and the RN to which the individual ONUs are connected. The network architectures of the present invention are all viable for use in a WDM-PON.

There are many different implementations of WDM-PONs. The COT may use multiple wavelength specified sources, or a tunable source. The ONU may use a wavelength-specified source, or a modulator. Finally, either may use a broadband source, which transmits light through each port of the router, such that the router behaves like an optical star coupler. In the latter case, the network architectures similar to those described for broadcast PONs may be implemented.

WDM-PON's use wavelength-specified or tunable lasers in the CO and/or the ONU. These are relatively expensive devices, and the cost is not shared among many users. As a result, it is desirable to minimize the number of such devices in the network. Techniques for doing so include the use of ONUs that do not require lasers because modulators are used, and the use of ONUs and COTs that have configurations that minimize the number of lasers used, for example through the use of switches. In addition, a tunable laser is more expensive than a wavelength-specified laser, but may be more cost effective if it can be used instead of multiple wavelength-specified lasers, or if the use of tunable lasers provides other benefits, such as avoiding the need to keep track of multiple ONU model numbers that have lasers specifying different wavelengths. For example, the use of tunable lasers may render ONUs interchangeable, which simplifies installation dramatically.

WGRs route light to a particular output port based on the input port, as well as the wavelength of the light. As a result, an alternative routing through a WGR for a particular signal may be achieved by changing the wavelength of the signal, for example by using a different wavelength-specified laser, or adjusting the wavelength of a wavelength tunable laser. An alternative routing may also be achieved by changing the port of the WGR into which the signal is input, for example by using switches. This alternative routing may be used to avoid a cut in an optical fiber or fiber-optic cable somewhere in the network. FIGS. 18 through 25 show ONU configurations useful in achieving desired routings through WGRs to which the ONUs are connected.

Figure 18:
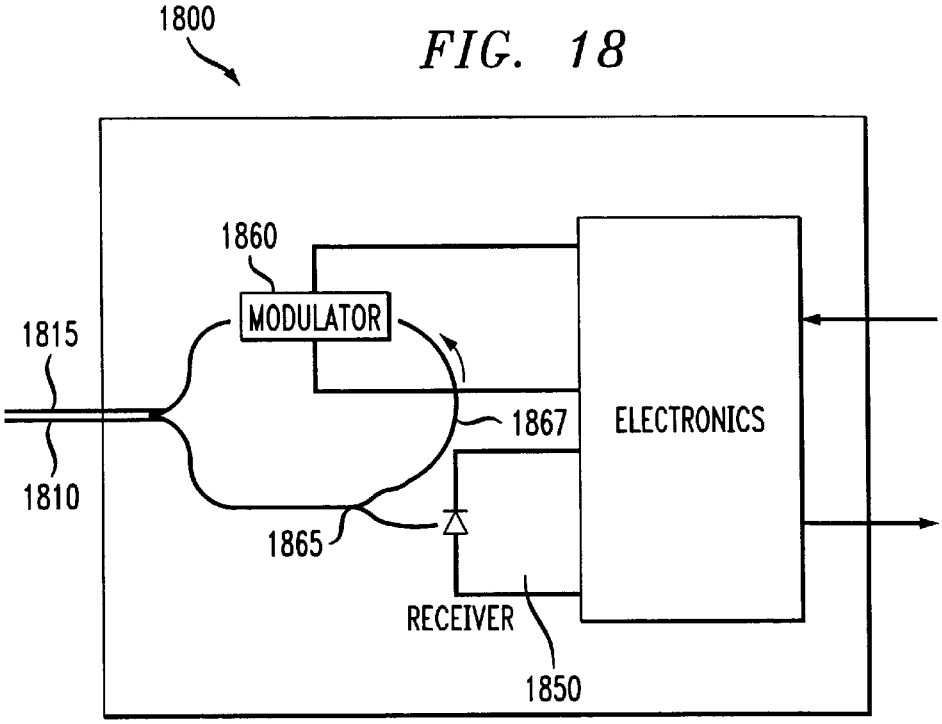
FIG. 18 shows an optical network unit adapted to receive a signal having a specified wavelength via an optical fiber, and to transmit signals having the same wavelength via another optical fiber.

FIG. 18 shows an ONU 1800 adapted to receive a signal having an arbitrary wavelength via optical fiber 1810, and to transmit signals having the same wavelength via optical fiber 1815. Except as described, ONU 1800 is similar to ONU 1100. ONU 1800 is adapted in a manner similar to ONU 1100 for use in networks offering particular types of protection.

ONU 1800 is adapted to receive and transmit signals having a specified wavelength. ONU 1800 has a modulator 1860 for transmitting information to the COT, instead of laser 1160. Some of the light sent to receiver 1850 via optical fiber 1810 is redirected to modulator 1860 via optical coupler 1865 and optical fiber 1867. This light has a particular wavelength, as determined by a laser in the COT that transmitted the light. The light is modified by modulator 1860, and used to transmit information to the COT. As a result, ONU 1800 does not require a laser, which advantageously minimizes the use of expensive components in a WDM-PON.

Figure 19:
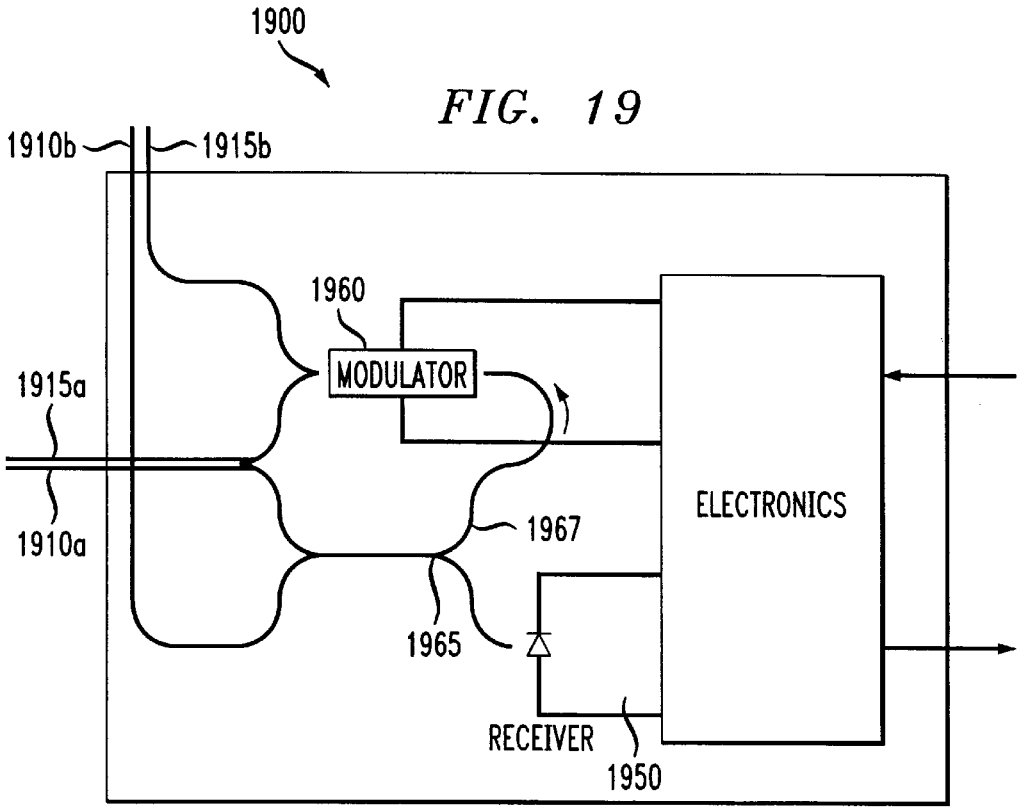
FIG. 19 shows an optical network unit adapted to receive a signal having a specified wavelength via one of two optical fibers at any given time, and to transmit a signal having the same wavelength via two other optical fibers at the same time.

FIG. 19 shows an ONU 1900 adapted to receive a signal having a specified wavelength via one of optical fibers 1910*a* or 1910*b* at any given time, and to transmit a signal having the same wavelength via optical fibers 1915*a* and 1915*b* at the same time. Except as described, ONU 1900 is similar to ONU 1200. ONU 1900 is adapted in a manner similar to ONU 1200 for use in networks offering particular types of protection.

ONU 1900 has a modulator 1960 for transmitting information to the COT, instead of laser 1260. Some of the light sent to receiver 1950 is redirected to modulator 1960 via optical coupler 1965 and optical fiber 1967. This light has a particular wavelength, determined by a laser in the COT that transmitted the light. The light is then modified by modulator 1960, and used to transmit information to the COT. As a result, ONU 1900 does not require a laser. If switching is acceptable in ONU 1900, the optical couplers may be replaced by optical switches to eliminate the loss of signal associated with the couplers.

Figure 20:
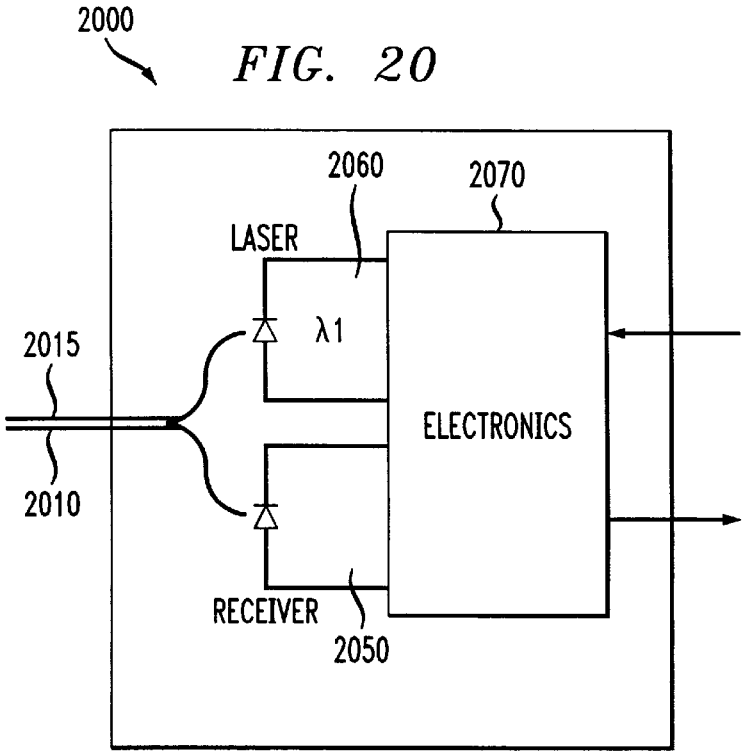
FIG. 20 shows an optical network unit adapted to receive a signal via an optical fiber, and to transmit a signal having either a specified wavelength or a tunable wavelength via another optical fiber.

FIG. 20 shows an ONU 2000 adapted to receive a signal via optical fiber 2010, and to transmit a signal having either a specified wavelength or a tunable wavelength via optical fiber 2015. Except as described, ONU 2000 is similar to ONU 1100. ONU 2000 is adapted in a manner similar to ONU 1100 for use in networks offering particular types of protection.

ONU 2000 has a laser 2060 that is either tunable or wavelength-specified, in contrast to laser 1160 of ONU 1100, which may have an unspecified wavelength. If laser 2060 is tunable, electronics 2070 are adapted to control the wavelength emitted by laser 2060. Laser 2060 transmits signals to the COT via optical fiber 2015.

Figure 21:
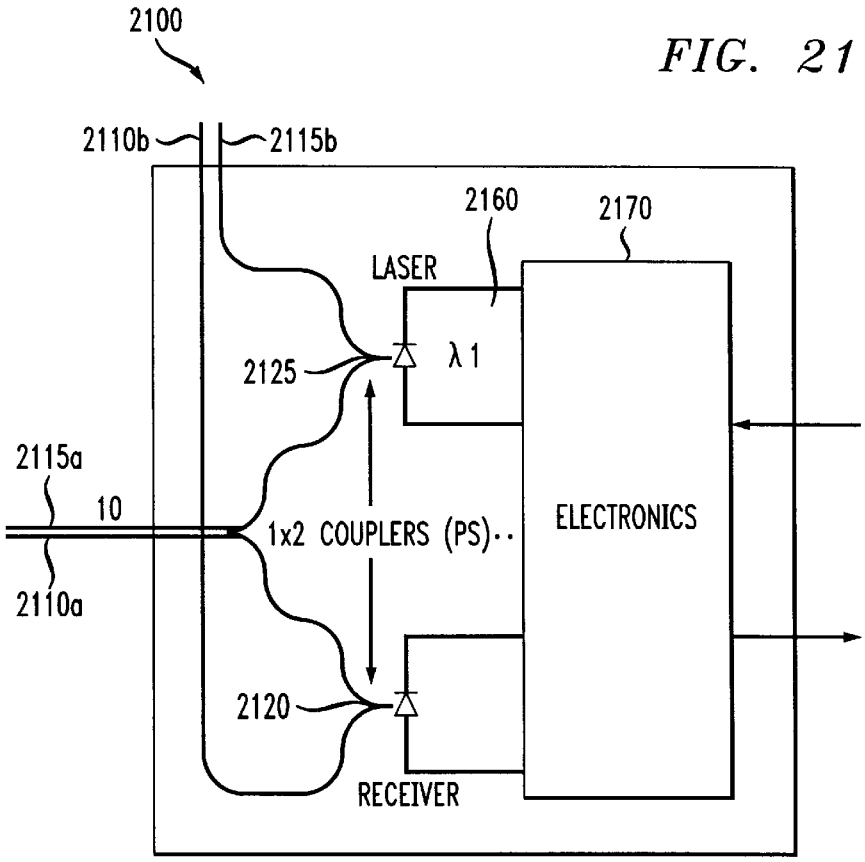
FIG. 21 shows an optical network unit adapted to receive via one of two optical fibers at any given time, and to simultaneously transmit identical signals having an identical wavelength via two other optical fibers.

FIG. 21 shows an ONU 2100 adapted to receive via one of optical fibers 2110*a* or 2110*b* at any given time, and to simultaneously transmit identical signals having an identical wavelength via optical fibers 2115*a* and 2115*b*. Except as described, ONU 2100 is similar to ONU 1200. ONU 2100 is adapted in a manner similar to ONU 1200 for use in networks offering particular types of protection.

ONU 2100 has a laser 2160 that is either tunable or wavelength-specified. If laser 2160 is tunable, electronics 2170 are adapted to control the wavelength emitted by laser 2160. If laser 2160 is wavelength specified, the WGRs to which optical fibers 2115*a* and 2115*b* are connected are preferably configured identically.

Figure 22:
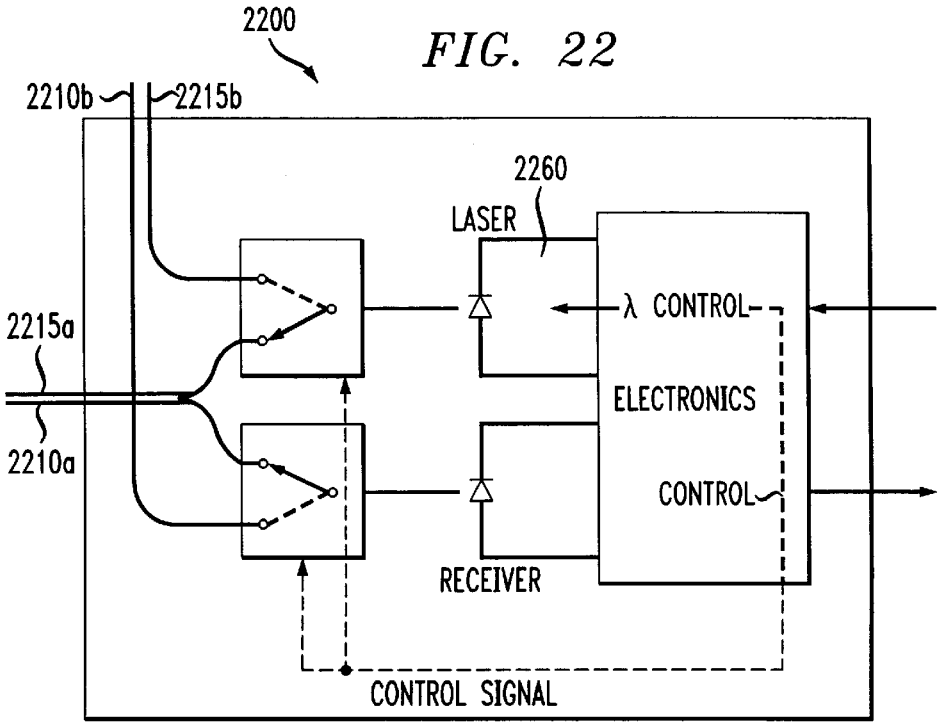
FIG. 22 shows an optical network unit adapted to switch between two optical fibers for receiving, and to switch between two other optical fibers for transmission.

FIG. 22 shows an ONU 2200 adapted to switch between optical fibers 2210*a* and 2210*b* for receiving, and to switch between optical fibers 2215*a* and 2215*b* for transmission. Except as described, ONU 2200 is similar to ONU 1300. ONU 2200 is adapted in a manner similar to ONU 1300 for use in networks offering particular types of protection.

Using an optical switch, as in FIG. 22, instead of an optical coupler, as in FIG. 21, may be preferable in an ONU that has other components, such as certain types of lasers, that have power and maintenance requirements similar to an optical switch. In such a situation, the switch does not add complexity to the network, but does avoid the loss associated with a 1×2 coupler.

ONU 2200 has a laser 2260 that is either tunable or wavelength-specified.

Figure 23:
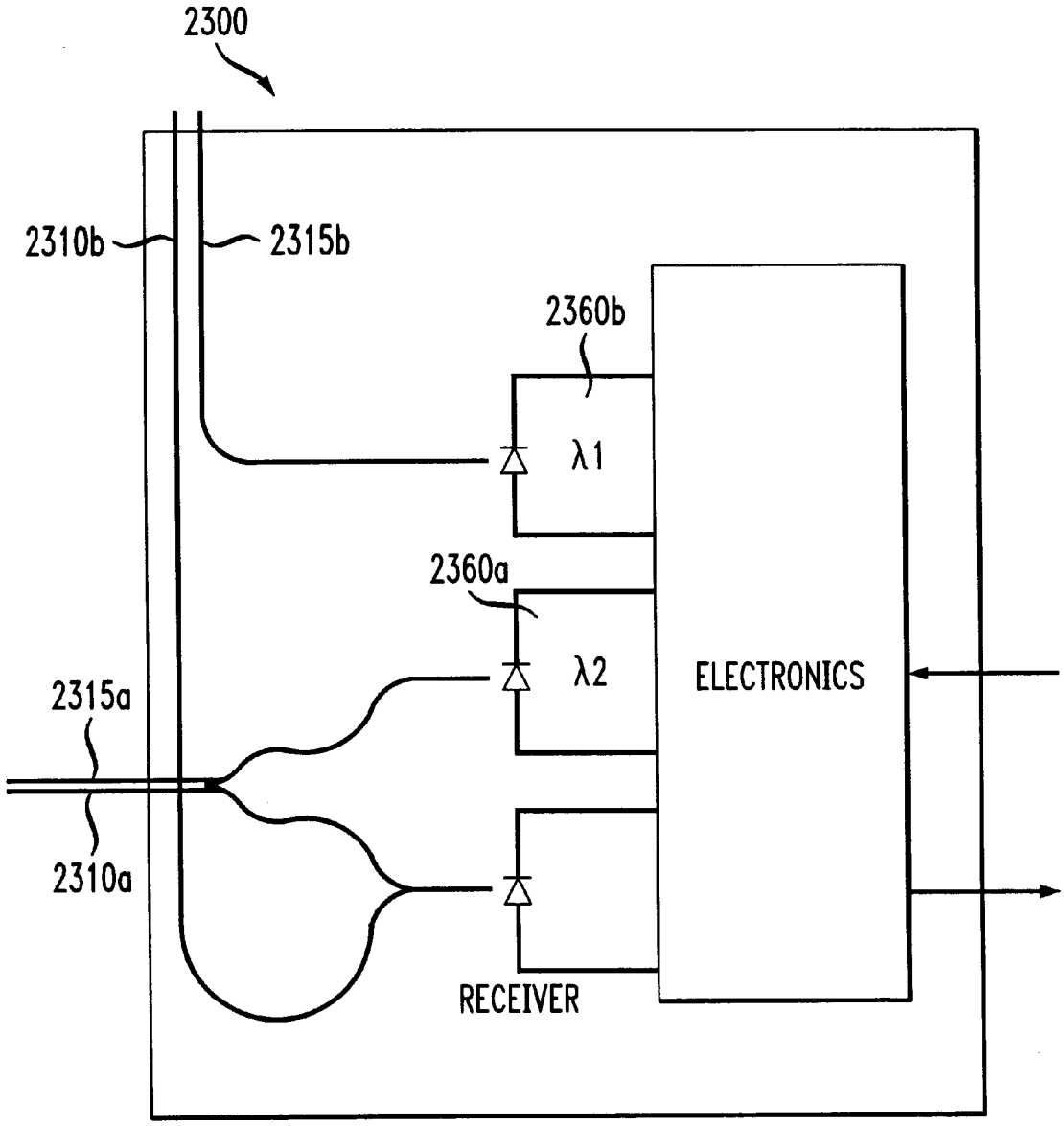
FIG. 23 shows an optical network unit adapted to receive a signal via one of two optical fibers at any given time, and to transmit signals having different specified wavelengths via two other optical fibers.

FIG. 23 shows an ONU 2300 adapted to receive a signal via one of optical fibers 2310*a* or 2310*b* at any given time, and to transmit signals having different specified wavelengths via optical fibers 2315*a* and 2315*b*. Except as described, ONU 2300 is similar to ONU 2100. ONU 2300 is adapted in a manner similar to ONU 2100 for use in networks offering particular types of protection.

Optical fiber 2315*a* is connected to a wavelength specified laser 2360*a*, and optical fiber 2315*b* is connected to a wavelength specified laser 2360*b* that specifies a wavelength different from laser 2360*a*.

ONU 2100 is preferred over ONU 2300. ONU 2100 is adapted in a manner similar to ONU 2300 for use in networks offering particular types of protection, and ONU 2100 only has one wavelength specified laser, while ONU 2300 has two. While ONU 2300 provides for two different specified wavelengths, the additional wavelength does not offer any flexibility that can not be achieved by properly configuring the routers to which optical fibers 2115*a* and 2115*b* are connected. The WGR to which optical fiber 2315*b* is connected must still be properly configured to ensure that the signal reaches the CO, even though optical fiber 2315*b* has a specified wavelength different from that of optical fiber 2315*a*.

Figure 24:
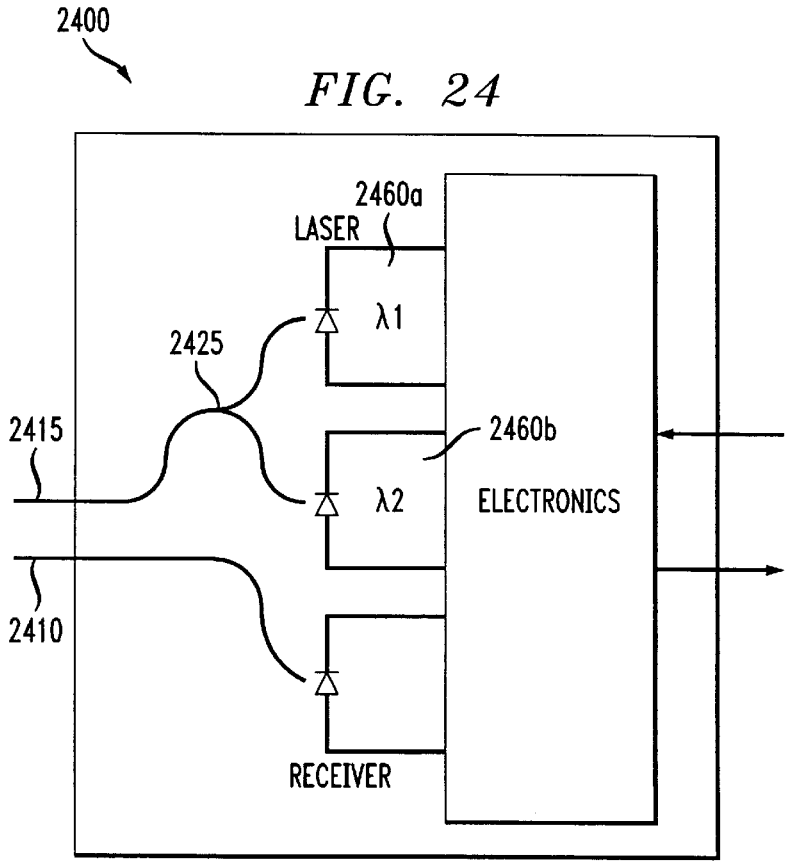
FIG. 24 shows an optical network unit adapted to receive a signal via an optical fiber, and to transmit via another optical fiber a signal having a wavelength selected from two specified wavelengths, or to simultaneously transmit via the other optical fiber two signals identical in all respects except wavelength.

FIG. 24 shows an ONU 2400 adapted to receive a signal via optical fiber 2410, and to transmit a signal via optical fiber 2415 having a wavelength selected from two specified wavelengths, or to simultaneously transmit two signals via optical fiber 2415 identical in all respects except wavelength. Except as described, ONU 2400 is similar to ONU 2000. ONU 2400 is adapted in a manner similar to ONU 2000 for use in networks offering particular types of protection.

ONU 2400 has two wavelength-specified lasers 2460*a* and 2460*b*, for which different wavelengths are specified. The signals from lasers 2460*a* and 2460*b* are merged onto a single fiber 2415 by optical coupler 2425 for transmission to the COT.

The wavelengths of lasers 2460*a* and 2460*b* are specified such that the WGR to which optical fiber 2415 is connected routes light of one wavelength to the CO via one path, and light of the other wavelength to the CO via a different path. Transmitting from both lasers 2460*a* and 2460*b* advantageously does not require switching in ONU 2400, while switching between lasers 2460*a* and 2460*b* requires switching, but advantageously reduces the power consumption of ONU 2400, and may simplify processing at the CO.

Figure 25:
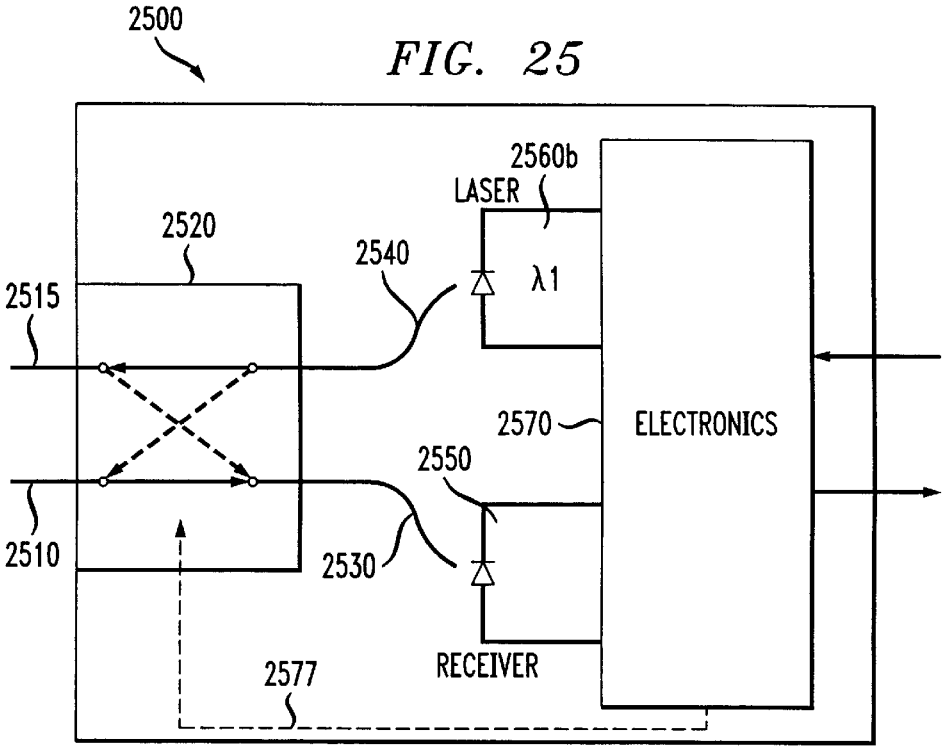
FIG. 25 shows an optical network unit adapted to either transmit a signal having a specified wavelength via a first optical fiber and receive a signal via a second optical fiber, or transmit a signal having a specified wavelength via the second optical fiber and receive a signal via the first optical fiber.

FIG. 25 shows an ONU 2500 adapted to either transmit a signal having a specified wavelength via optical fiber 2510 and receive a signal via optical fiber 2515, or transmit a signal having a specified wavelength via optical fiber 2515 and receive a signal via optical fiber 2510. Except as described, ONU 2500 is similar to ONU 2000. ONU 2500 is adapted in a manner similar to ONU 2000 for use in networks offering particular types of protection.

ONU 2500 has a 2×2 optical switch 2520 that is controlled via connection 2577 by electronics 2570, and has two states. In a first state, optical switch 2520 connects optical fiber 2510 to receiver 2550 via optical fiber 2530, and connects optical fiber 2515 to laser 2560, which is wavelength specified, via optical fiber 2540. In a second state, optical switch 2520 connects optical fiber 2510 to laser 2560 via optical fiber 2540, and optical fiber 2515 to receiver 2550 via optical fiber 2530. As a result, ONU 2500 may either receive via optical fiber 2510 and transmit via optical fiber 2515, or switch the direction of traffic on optical fibers 2510 and 2515, such that ONU 2500 transmits via optical fiber 2510 and receives via optical fiber 2515. ONU 2500 is preferably used with remote nodes that are WGRs having configurations adapted to take full advantage of this switching capability, such as WGRs 3300 and 3400 of FIGS. 33 and 34, respectively.

Figure 26:
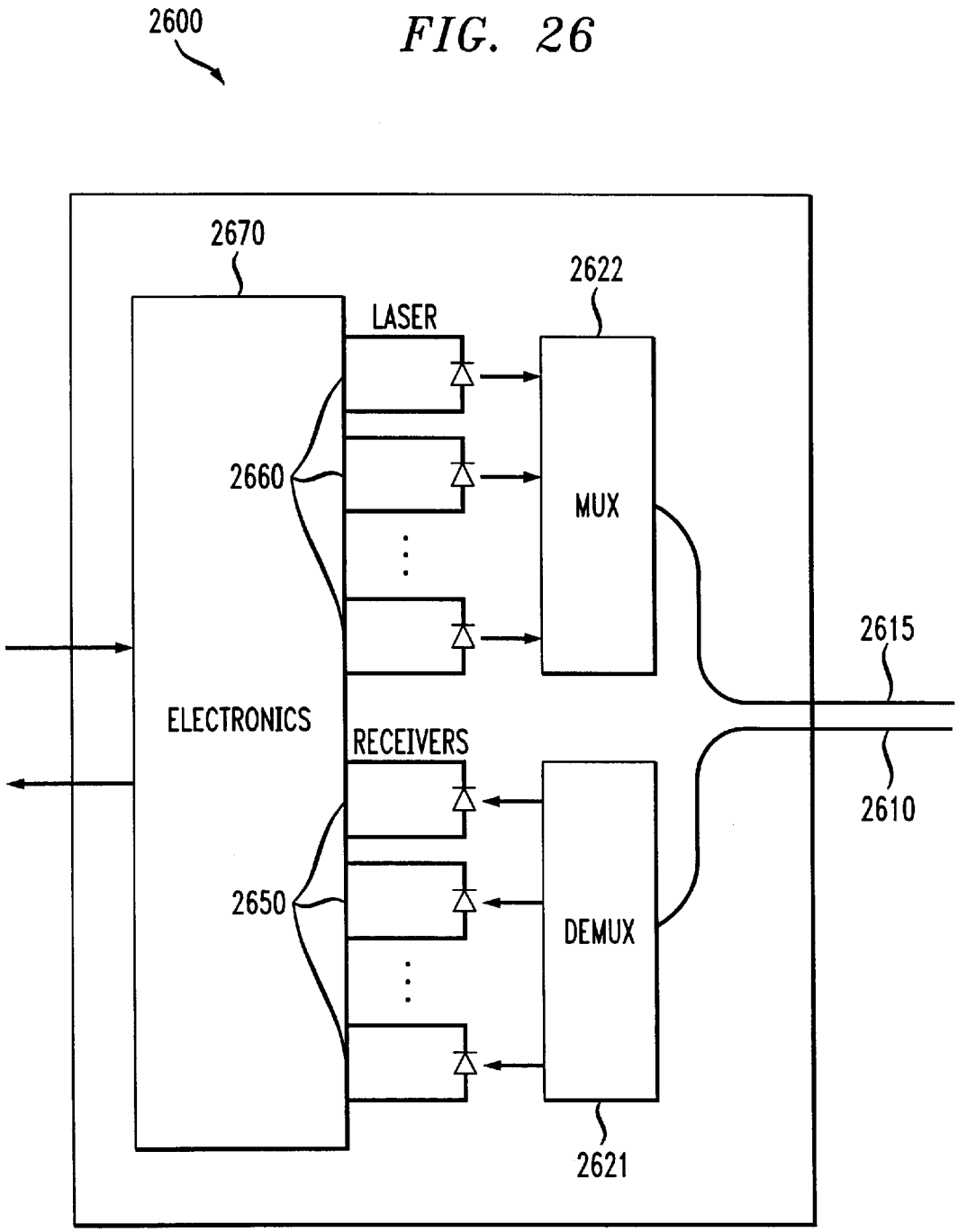
FIG. 26 shows a central office transceiver adapted to transmit via an optical fiber a plurality of signals differentiated by wavelength, and to receive via another optical fiber a plurality of signals differentiated by wavelength.

Central Office Transceivers for Use With Wavelength Grating Router Remote Nodes FIG. 26 shows a COT 2600 adapted to transmit a plurality of signals differentiated by wavelength via optical fiber 2615, and to receive a plurality of signals differentiated by wavelength via optical fiber 2610. Except as described, COT 2600 is similar to COT 1600. COT 2600 is adapted in a manner similar to COT 1600 for use in networks offering particular types of protection.

An optical fiber 2610 is coupled to a demultiplexer 2621, which is in turn coupled to a plurality of receivers 2650. A number of signals from a plurality of different ONUs may be transmitted to COT 2600 via optical fiber 2610. Preferably, each different signal is carried by a different wavelength of light. Demultiplexer 2621 separates these different signals for transmission to the appropriate receiver 2650. A plurality of receivers 2650 are adapted to receive one signal each from demultiplexer 2621.

An optical fiber 2615 is coupled to a multiplexer 2622, which is in turn coupled to a plurality of lasers 2660. A different wavelength is specified for each laser 2660. Multiplexer 2622 is adapted to receive a plurality of signals, one from each laser 2660, and transmit the signals via optical fiber 2615 to a RN (not shown), which is adapted to separate the signals based on wavelength for transmission to particular ONUs.

Receivers 2650 and lasers 2660 are connected to electronics 2670, which are adapted to communicate with the CO of which COT 2600 is a part.

Figure 27:
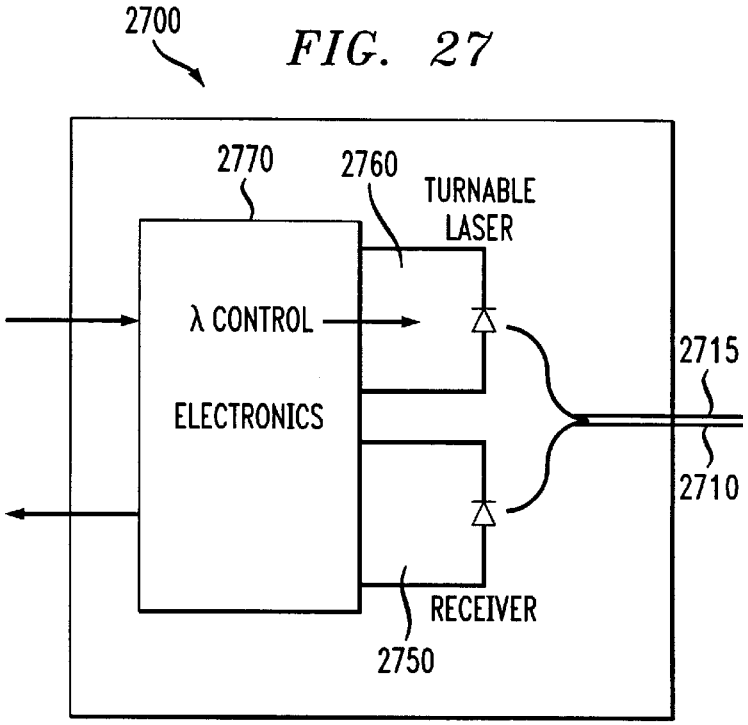
FIG. 27 shows a central office transceiver adapted to sequentially transmit via an optical fiber a plurality of signals differentiated by wavelength, and to receive a plurality of signals via another optical fiber.

FIG. 27 shows a COT 2700 adapted to sequentially transmit a plurality of signals differentiated by wavelength via optical fiber 2715, and to receive a plurality of signals differentiated by wavelength via optical fiber 2710. Except as described, COT 2700 is similar to COT 2600. COT 2700 is adapted in a manner similar to COT 2600 for use in networks offering particular types of protection.

An optical fiber 2710 is connected to a receiver 2750. Receiver 2750 is adapted to distinguish different signals received from optical fiber 2710 based on the wavelength or timing of the signals. An optical fiber 2715 is connected to a laser 2760. Laser 2760 is a wavelength tunable laser, adapted to transmit signals via optical fiber 2715 having a variety of wavelengths. The wavelength is controlled by electronics 2760.

Figure 28:
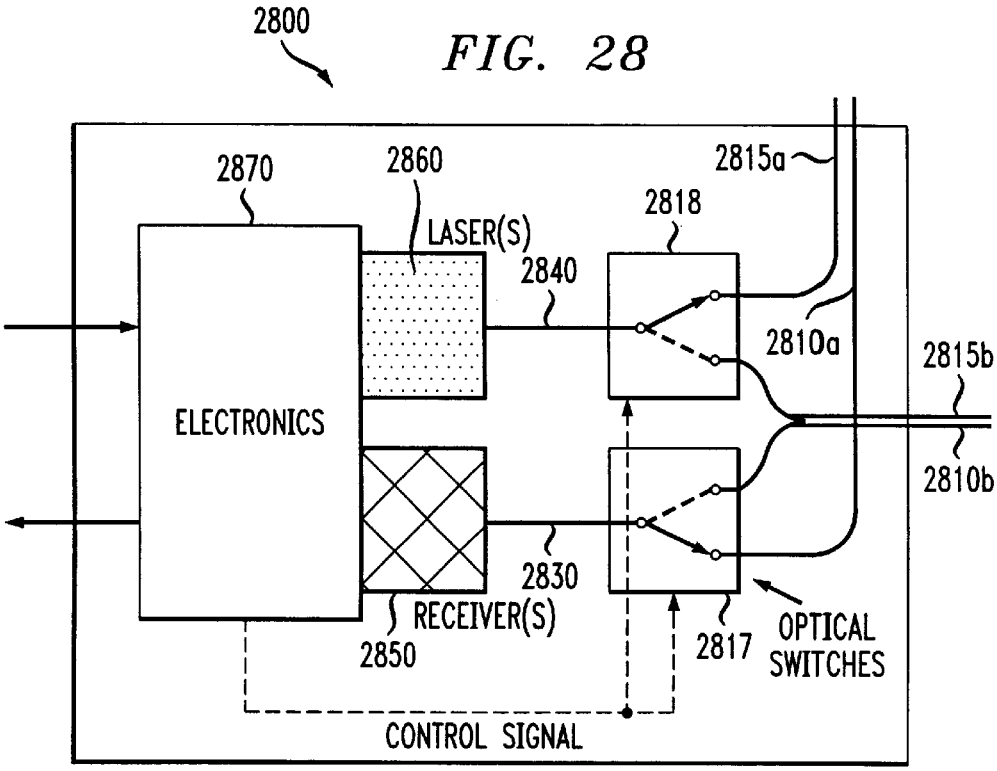
FIG. 28 shows a central office transceiver adapted to transmit via a first optical fiber a plurality of signals differentiated by wavelength and receive via a second optical fiber a plurality of signals differentiated by wavelength, or to transmit via a third optical fiber a plurality of signals differentiated by wavelength and receive via a fourth optical fiber a plurality of signals differentiated by wavelength, and to switch between the two states.

FIG. 28 shows a COT 2800 adapted to transmit a plurality of signals differentiated by wavelength via optical fiber 2815*a* and receive a plurality of signals differentiated by wavelength via optical fiber 2810*a,* or to transmit a plurality of signals differentiated by wavelength via optical fiber 2815*b* and receive a plurality of signals differentiated by wavelength via optical fiber 2810*b,* and to switch between the two states. Except as described, COT 2800 is similar to COT 1700. COT 2800 is adapted in a manner similar to COT 1700 for use in networks offering particular types of protection.

Receiver 2850 may be a single receiver, adapted to distinguish signals received from optical switch 2817 via optical fiber 2830 in a manner similar to receiver 2750 of COT 2700, or may be a demultiplexer connected to a plurality of receivers, and adapted to separate signals for transmission to a particular receiver based on wavelength, in a manner similar to demultiplexer 2621 and receivers 2650 of COT 2600.

Laser 2860 is adapted to transmit a plurality of signals, each having a different wavelength, to optical switch 2818 via optical fiber 2840. Laser 2860 may be a wavelength tunable laser, similar to laser 2760 of COT 2700, or a plurality of lasers connected to a multiplexer, similar to lasers 2650 and multiplexer 2622 of COT 2600.

COT 2800 may be used without requiring that a signal transmitted from the CO to a particular ONU via optical fiber 2815*a* use the same wavelength as when the signal is transmitted via optical fiber 2815*b*. In this situation, electronics 2860 may be capable of changing the wavelengths assigned to a particular ONU when optical switch 2818 switches from optical fiber 2815*a* to optical fiber 2815*b* or vice-versa. This may require that COT 2800 be capable of producing more wavelengths than would otherwise be required.

Routers for Use in a WDM-PON having Wavelength Grating Routers

Wavelength grating routers (WGRs) have a plurality of ports, and are adapted to route light from a particular port to any of a number of other ports, based on the wavelength of the light. Usually, this routing is relative to the input port, such that two signals having the same wavelength, but input into different ports, will be routed to different ports. In particular, a WGR having a periodicity on N has N left-side ports numbered L0 through L(N−1) and N right-side ports numbered R0 through R(N−1) may be adapted to route light of wavelength λi from port Ln to port Rm, where m =n+i (modulo N), i.e., m is the remainder of (n+i)/N. Such a WGR may also be adapted to route light from right-hand ports to left-hand ports based on a similar function. WGRs may be used as RNs in PONs.

Couplers and filters may be used to replicate the functionality of a router necessary to practice the present invention, using techniques known to the art (the periodicity of a router may be difficult to replicate, but is not necessary for the present invention). Such couplers and filters can be substituted for the routers described herein.

Whether light of specific wavelengths is provided by multiple wavelength specified lasers, or by a single tunable laser, WGRs are adapted to route the light based on the wavelength of the light and the port of the WGR to which the light is transmitted. For example, a CO may transmit a signal having a specific wavelength to a particular port of the WGR, which is a RN connected to a plurality of ONUs. The WGR routes the signal to another port connected to the ONU for which the signal is intended, based on the wavelength of the signal and the port of the WGR to which it was transmitted. A signal having a different specific wavelength may be transmitted from the CO to the same port of the WGR, and it will be routed to a different port of the WGR, possibly connected to a different ONU, because the wavelength is different. Similarly, signals having different wavelengths may be transmitted by different ONUs to different ports of a WGR, and the WGR may route the signals to the same port for transmission to the CO.

Figure 29:
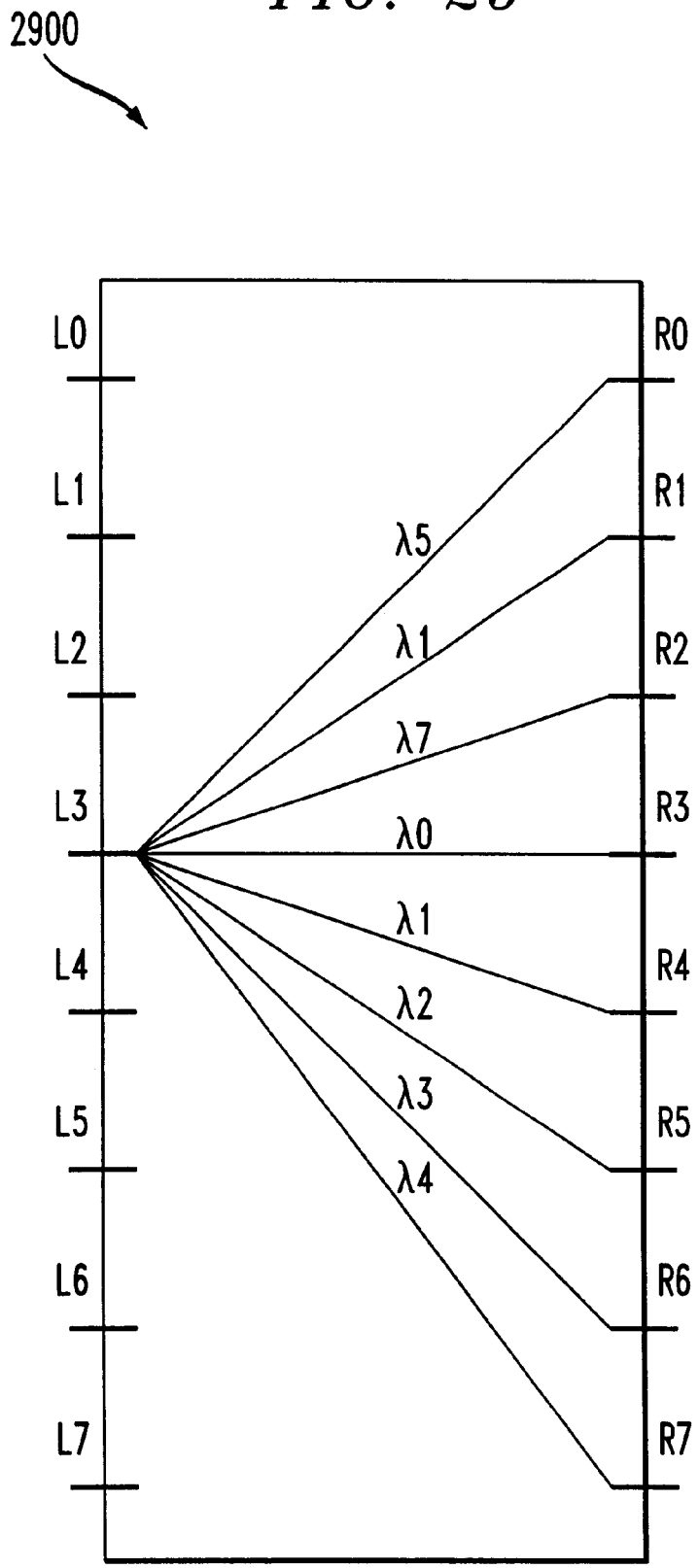
FIG. 29 shows a wavelength grating router (WGR).

FIG. 29 shows a wavelength grating router (WGR) 2900. WGR 2900 has eight right-side ports, R0, R1, R2, R3, R4, R5, R6, and R7, and eight left-side ports, L0, L1, L2, L3, L4, L5, L6, and L7. WGR 2900 is adapted to route light of wavelength λi from port Ln to port Rm, where m=n+i (modulo N). Lines λ0, λ1, λ2, λ3, λ4, λ5, λ6, and λ7 represent such routing from left-side port L3. WGR 2900 is also adapted to route light from right-side ports R0 through R7 to left-side ports L0 through L7 based on a similar function.

Figure 30:
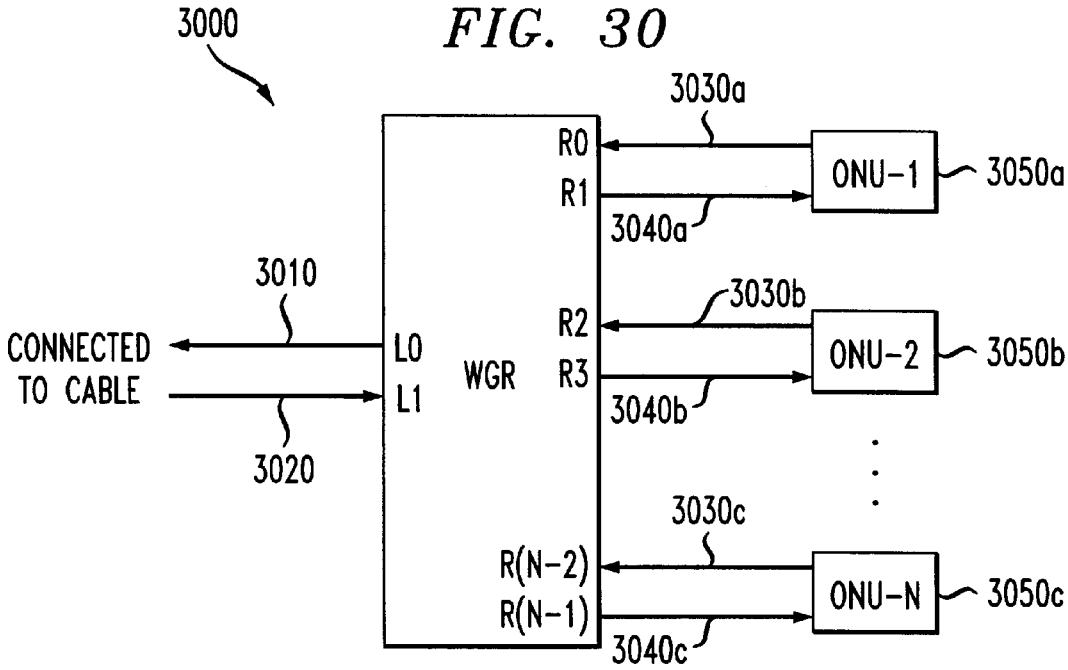
FIG. 30 shows a WGR adapted for use in a passive optical network (PON) having separate fibers for transmissions in different directions.

FIG. 30 shows a WGR 3000 adapted for use in a PON having separate fibers for transmissions in different directions. WGR 3000 is adapted for use as a RN in a network that provides full-fiber protection, by providing two similarly configured WGRs 3000 for a group of ONUs.

Optical fiber 3010 is connected to left-side port L0 of WGR 3000, and optical fiber 3020 is connected to left-side port L1 of WGR 3000. A plurality of ONUs 3050, including ONUs 3050*a,* 3050*b* and 3050*c,* are adapted to transmit signals to right side ports R0, R2 and R(N−2) of WGR 3000 via optical fibers 3030*a,* 3030*b* and 3030*c*, respectively. ONUs 3050*a,* 3050*b* and 3050*c* are also adapted to receive signals from right-side ports R1, R3 and R(N−1) of WGR 3000 via optical fibers 3040*a,* 3040*b* and 3040*c*, respectively. Although only three ONUs 3050 are shown, up to N/2 ONUs may be connected to right-side ports of WGR 3000.

A plurality of different signals, distinguished by wavelength, may be transmitted from a CO to WGR 3000 via optical fiber 3020. WGR 3000 is adapted to separate these signals based on wavelength and route them to the proper right-side port for transmission to the appropriate ONU 3050. Similarly, each ONU 3050 may transmit a signal to WGR 3000, where each such signal has a different wavelength. For example, each ONU 3050 may have a wavelength specified laser where the wavelengths specified are different. WGR 3000 is adapted to route each of these signals to left-side port L0 for transmission to a CO via optical fiber 3010.

Figure 31:
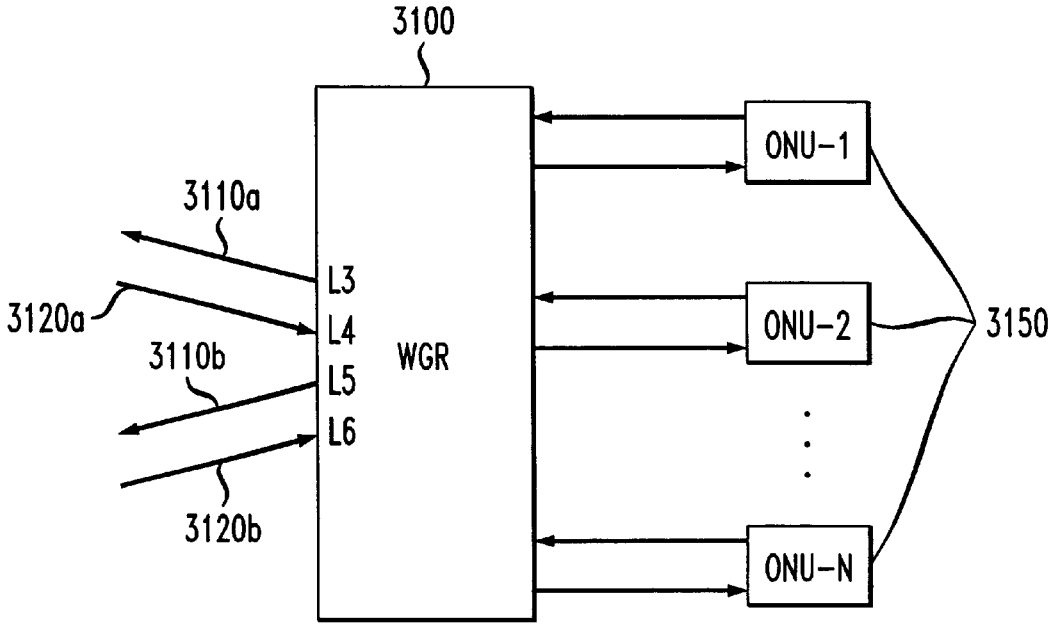
FIG. 31 shows a WGR adapted for use in a PON having separate fibers for transmissions in different directions.

FIG. 31 shows a WGR 3100 adapted for use in a PON having separate fibers for transmissions in different directions. WGR 3100 is adapted for use in a network that provides cable-redundant protection.

Optical fiber 3110*a* is connected to left-side port L3 of WGR 3100, and optical fiber 3110*b* is connected to left-side port L5 of WGR 3100. Optical fiber 3120*a* is connected to left-side port L4 of WGR 3100, and optical fiber 3120*b* is connected to left-side port L6 of WGR 3100. ONUs 3150 are connected to WGR 3100 in a manner similar to the way ONUs 3050 are connected to ONU 3000.

A plurality of different signals, distinguished by wavelength, may be transmitted from a CO to WGR 3100 via optical fiber 3120*a*. WGR 3100 is adapted to separate these signals based on wavelength and route them to the proper right-side port for transmission to the appropriate ONU 3150. Optical fiber 3120*b* provides an alternate route for the transmission of a plurality of signals, distinguished by wavelength, from the CO to WGR 3100. Because optical fiber 3120*a* is connected to left-side port L4, and optical fiber 3120*b* is connected to left-side port L6, a signal routed from optical fiber 3120*a* to a particular ONU will not be routed to the same ONU from optical fiber 3120*b* unless a different wavelength $\lambda$ is used. In particular, if a wavelength $\lambda i$ is used for transmission of a particular signal via optical fiber 3120*a*, a wavelength $\lambda j$, where $\lambda i$ is not equal to $\lambda j$ (modulo N), should be used for transmission via optical fiber 3120*b*. WGR 3100 is therefore preferably used with a COT adapted to transmit a particular signal via optical fiber 3120*a* with a wavelength $\lambda i$, and via optical fiber 3120*b* with a wavelength $\lambda j$.

Similarly, each ONU 3150 may transmit a signal to WGR 3100, where each such signal has a particular wavelength. WGR 3100 is adapted to route each of these signals to either left-side port L3 for transmission to a CO via optical fiber 3110*a*, or to left-side port L5 for transmission to a CO via optical fiber 3110*b*, depending on the particular wavelength used by an ONU to transmit signals to WGR 3100. WGR 3100 is therefore preferably used with ONUs 3150 adapted to transmit signals having different wavelengths, for example by using a wavelength-tunable laser or a pair of wavelength specified lasers of different wavelengths.

WGR 3100 is adapted for use with ONUs that use the same wavelength to transmit and receive signals, such as ONUs having modulators instead of lasers. Because each fiber in the pair of optical fibers 3110*a* and 3120*a*, the pair of optical fibers 3110*b* and 3120*b*, and each pair of optical fibers connected to a particular ONU is connected to adjacent ports of WGR 3100, the fibers in each pair are displaced from one another by one port. As a result, when light of a particular wavelength is mapped from optical fiber 3120*a* across WGR 3100 to a port that transmits to a particular ONU, light of the same wavelength will be mapped from the port that receives from that ONU to optical fiber 3110*a*. The same holds true for optical fibers 3120*b* and 3110*b*.

Figure 32:
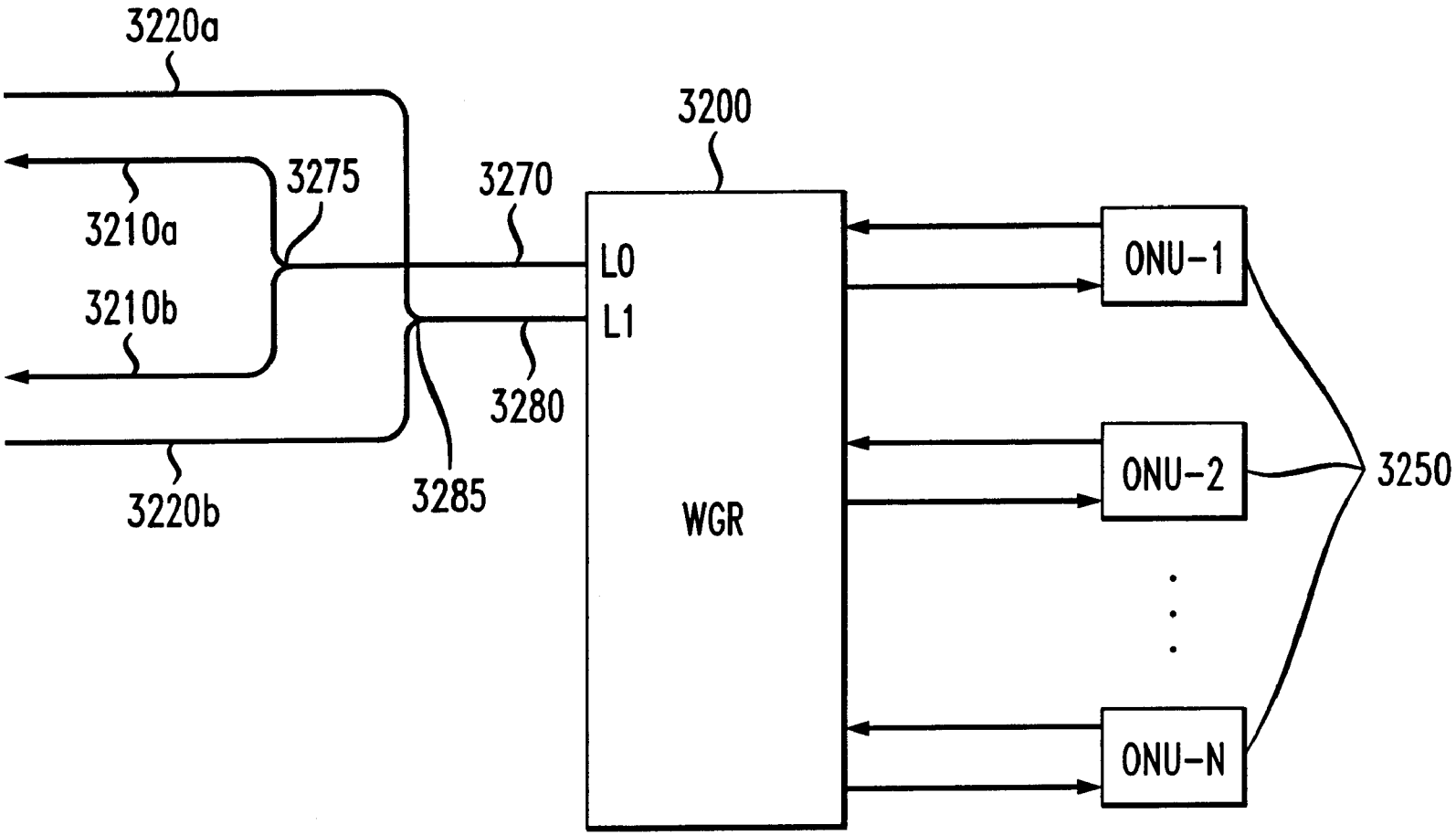
FIG. 32 shows a WGR adapted for use in a PON having separate fibers for transmissions in different directions.

FIG. 32 shows a WGR 3200 adapted for use in a PON having separate fibers for transmissions in different directions. WGR 3200 is similar to WGR 3000, except as discussed. WGR 3200 is adapted for use in a network that provides cable-redundant protection.

WGR 3200 is configured in a manner similar to WGR 3000. However, the plurality of signals differentiated by wavelength transmitted from port L0 is transmitted via optical fiber 3270 to an optical coupler 3275. Optical coupler 3275 is adapted to split this plurality of signals into two identical pluralities of signals for simultaneous transmission to the CO via both optical fibers 3210*a* and 3210*b*. Also, optical coupler 3285 is adapted to combine two pluralities of signals differentiated by wavelength transmitted by the CO via optical fibers 3220*a* and 3220*b* into a single plurality of signals for transmission via optical fiber 3280 to port L1 of WGR 3200. Preferably, the CO is adapted to send signals via optical fiber 3220*a* or optical fiber 3220*b*, but not both, at any given time, to avoid interference between signals. ONUs 3250 are connected to WGR 3200 in a manner similar to the way ONUs 3050 are connected to ONU 3000.

WGR 3200 is preferably not used with ONUs having modulators, because such use would result in light passing through at least two couplers, each of which causes a loss of signal strength.

Figure 33:
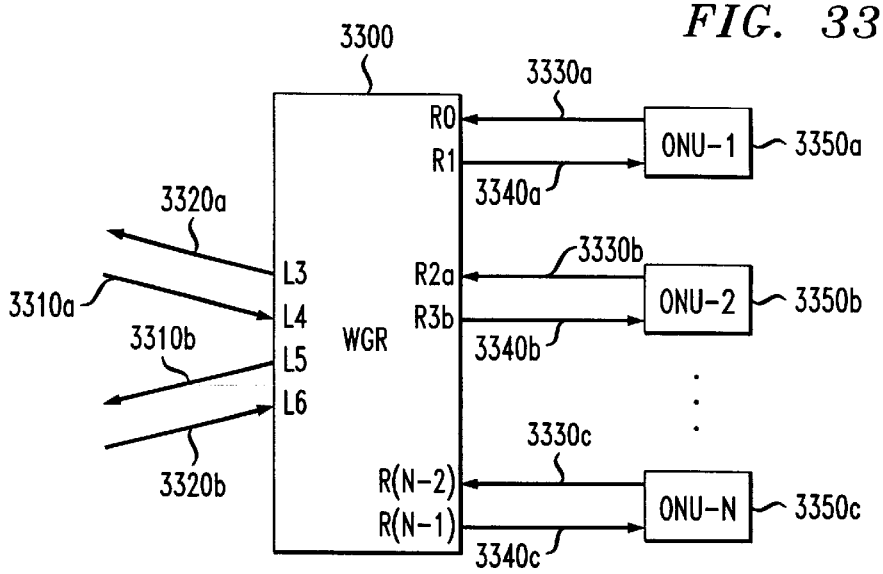
FIG. 33 shows a WGR adapted for use in a PON having separate fibers for transmissions in different directions.

FIG. 33 shows a WGR 3300 adapted for use in a PON having separate fibers for transmissions in different directions. WGR 3300 is similar to WGR 3100, except as discussed. WGR 3300 is adapted for use in a network that provides cable-redundant protection.

WGR 3300 is similar to WGR 3100, but adapted for use with ONUs 3350 connected to WGR 3300 by two optical fibers each, and adapted to switch the direction of communication in each fiber, for example in a manner similar to that described for ONU 2500. Optical fiber 3310*a* is connected to left-side port L4 of WGR 3300, and optical fiber 3310*b* is connected to left-side port L5 of WGR 3300. Optical fiber 3320*a* is connected to left-side port L3 of WGR 3300, and optical fiber 3320*b* is connected to left-side port L6 of WGR 3300.

A plurality of ONUs 3350, including ONUs 3350*a*, 3350*b* and 3350*c*, are adapted to transmit signals to right side ports R0, R2 and R(N−2) of WGR 3300 via optical fibers 3330*a*, 3330*b* and 3330*c*, respectively. ONUs 3350*a*, 3350*b* and 3350*c* are also adapted to receive signals from right-side ports R1, R3 and R(N−1) of WGR 3300 via optical fibers 3340*a*, 3340*b* and 3340*c*, respectively. Although only three ONUs 3350 are shown, up to N/2 ONUs may be connected to right-side ports of WGR 3300.

In the embodiment of FIG. 33, the displacement, in terms of number of ports, between the port to which optical fibers 3310*a* and 3310*b* are connected, is the same as the displacement between the ports to which each ONU's 3350 pair of optical fibers are connected. For example, in FIG. 33, optical fibers 3310*a* and 3310*b* are connected to ports L4 and L5, respectively, which are adjacent ports. Accordingly, each ONU 3350 is connected to a pair of adjacent ports, such as ONU 3350*a*, which is connected to ports R0 and R1 by optical fibers 3330*a* and 3340*a*, respectively.

As a result, each ONU 3350 can select optical fiber 3310*a* or 3310*b* for transmission to the CO by selecting which optical fiber to use for transmission to WGR 3300, without changing the wavelength of light. For example, ONU 3350*a* may have a wavelength specified laser of wavelength $\lambda 4$, such that light sent to port R0 via optical fiber 3330*a* is routed to port L4 and optical fiber 3310*a*, and light sent to port R1 via optical fiber 3340*a* is routed to port L5 and optical fiber 3310*b*.

However, light transmitted by the CO to WGR 3300 for transmission to a particular ONU should have a different wavelength depending on whether optical fiber 3320*a* or

3320*b* is used, because ports L3 and L6 are not adjacent. Preferably, the use of different wavelengths for transmission to WGR 3300 is avoided by connecting optical fibers 3320*a* and 3320*b* to adjacent ports. For example, optical fiber 3320*a* could be connected to port L3, and optical fiber 3320*b* could be connected to port L2.

Figure 34:
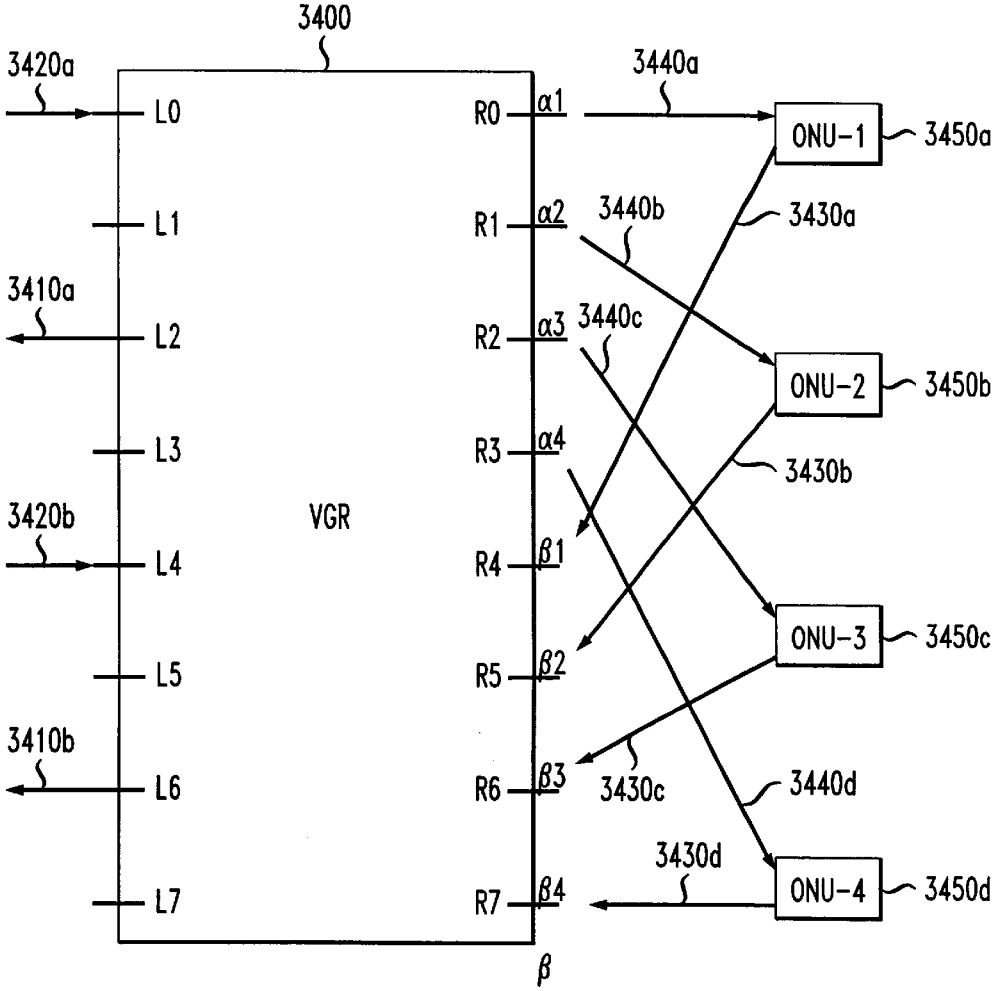
FIG. 34 shows a WGR adapted for use in a PON having separate fibers for transmissions in different directions.

FIG. 34 shows a WGR 3400 adapted for use in a PON having separate fibers for transmissions in different directions. WGR 3400 is similar to WGR 3300, except as discussed. WGR 3400 is adapted for use in a network that provides cable-redundant protection.

WGR 3400 is similar to WGR 3300, in that WGR 3400 is adapted for use with ONUs 3450, including ONUs 3450*a*, 3450*b*, 3450*c* and 3450*d*, connected to WGR 3400 by two optical fibers each, and adapted to switch the direction of communication in each fiber, for example in a manner similar to that described for ONU 2500. However, WGR 3400 is configured differently from WGR 3300, such that the wavelength of light used by ONUs 3450 and the CO need not be changed, even when the light travels by an alternate path, advantageously reducing the total cost of providing lasers.

Optical fiber 3420*a* is connected to port L0, and provides a first path for transmissions from the CO to WGR 3400. Optical fiber 3420*b* is connected to port L4, displaced from port L0 by four ports, and provides a second path for transmissions from the CO to WGR 3400. Optical fiber 3410*a* is connected to port L2, and provides a first path for transmissions from WGR 3400 to the CO. Optical fiber 3410*b* is connected to port L6, displaced from port L2 by four ports, and provides a second path for transmissions from WGR 3400 to the CO.

Each ONU 3450 is connected to a pair of ports of WGR 3400, by a pair of optical fibers, and is adapted to switch which optical fiber is used for transmission to WGR 3400 and which is used to receive transmissions from WGR 3400. ONU 3450*a* is connected to port R0 by optical fiber 3440*a* and to port R4 by optical fiber 3430*a*. ONU 3450*b* is connected to port R1 by optical fiber 3440*b* and to port R5 by optical fiber 3430*b*. ONU 3450*c* is connected to port R2 by optical fiber 3440*c* and to port R6 by optical fiber 3430*c*. ONU 3450*d* is connected to port R3 by optical fiber 3440*d* and to port R7 by optical fiber 3430*d*. The pair of ports to which a particular ONU 3450 is connected are therefore displaced by four ports.

Because the ports to which optical fibers 3410*a* and 3410*b*, optical fibers 3420*a* and 3420*b*, and the pair of optical fibers connected to each ONU 3450 are separated by the same number of ports, four in the embodiment of FIG. 34, each ONU 3450 may switch the fiber used for transmission from the ONU to WGR 3400 with the fiber used for transmission from WGR 3400 to the ONU, and the CO may switch to alternate paths for communication with WGR 3400, without changing the wavelengths used for each ONU.

For example, the CO may transmit a signal for ONU 3450*a* using wavelength λ0 via optical fiber 3420*a* to port L0. This signal will be routed to port R0 of WGR 3400, and then to ONU 3450*a* via optical fiber 3440*a*. ONU 3450*a* may transmit a signal for the CO using wavelength λ6 via optical fiber 3430*a* to port R4. This signal will be routed to port L2, and then to the CO via optical fiber 3430*a*.

If a failure is detected between the CO and WGR 3400 along either optical fiber 3410*a* or 3420*a*, the CO may switch to optical fibers 3410*b* and 3420*b*, while ONU 3450*a* switches optical fiber 3430*a* from transmission to receiving and optical fiber 3440*a* from receiving to transmission. After the switch, the CO may transmit a signal for ONU 3450*a* using wavelength λ0, the same wavelength previously used, via optical fiber 3420*b* to port L4. This signal will be routed to port R4, and then to ONU 3450*a* via optical fiber 3330*a*. ONU 3450*a* may transmit a signal for the CO using wavelength λ6, the same wavelength previously used, via optical fiber 3440*a* to port R0. This signal will be routed to port L6, and then to the CO via optical fiber 3410*a*.

Mini-Fiber Node Systems

A coaxial cable may be used to connect a single ONU to a plurality of homes, for example about 509 homes, as described in Lu et al., Mini-fiber-node hybrid fiber coax networks for two-way broadband access, Optical Fiber Communication Conference '96 Technical Digest, W13 pp. 143–144, Feb. 1996, which is incorporated by reference. The present invention may be used to provide full-fiber redundancy or cable redundancy to such ONUs. Preferably, a local access network is used in which upstream and downstream traffic travel along a single fiber, to reduce the fiber count at the CO. Note that a RN is not necessarily present in this architecture.

ONUs, COTs and RNs for Use in Network Architectures

Table 1 shows preferred combinations of ONUs, COTs, and couplers used as RNs in a broadcast PON network architecture employing separate fibers for upstream and downstream transmission. The ONUs, COTs, and network architectures are referred to by Figure number. Table 1 also shows an estimated cost for each architecture, the estimated maximum failure group size for a single event such as a cut cable or fiber, or damaged RN, and the expected optical loss of a signal traveling through the network. η refers to the maximum transmission loss from the CO to the ONU, not including the splitting loss at the coupler, in the unprotected system.

TABLE 1

Summary for Broadcast PON

| Network Architecture (FIG. #) | ONU FIG. # | COT FIG. # | Coupler(s) | Cost | Failure Group | optical loss |
|---|---|---|---|---|---|---|
| Unprotected (1) | 11 | 16 | 1 × N | reference | >>N | η |
| Fully Redundant (3) | 12 | 17 | two 1 × N | ≈ double | 0 | η 3 dB |
| Fully Redundant (3) | 13* | 17 | two 1 × N | ≈ double (Most expensive) | 0 | η |
| Cable Redundant (4) | 11 | 17 | 2 × N | <double | N | η |
| Cable Ring (6) | 11 | 17 | 2 × N | <<double | N | <3 η |

*ONU 13 requires switching at the ONU.

Table 2 shows preferred combinations of ONUs, COTs, and WGRs used as RNs in a WDM-PON employing separate fibers for upstream and downstream transmission. The ONU's, COTs WGRS, and network architectures are referred to by Figure number. The combinations described by Table 2 and the Figures referred to by Table 2 have separate fibers for upstream and downstream communication. These combinations are readily adapted for use in a network having one fiber for both upstream and downstream communication.

TABLE 2

Summary

| Network Architecture | ONU | COT | WGR |
|---|---|---|---|
| Modulator-Based ONUs | | | |
| Unprotected (1) | 18 | 26 or 27 | 30* |
| Fully Redundant (3) | 19 | 28 | 30* (two)[i] |
| Fully Redundant (3) | 19 | 28[r] | 30* (two)[i] |
| Cable Redundant (4) or | 18 | 28[r] | 31* |
| Cable Ring (6) | 18 | 28 | 32*[†] |
| Laser-Based ONU's | | | |
| Baseline (1a, unprotected) | 20 | 26 or 27 | 30 |
| Fully Redundant (1b) | 21 | 28 | 30 (two)[i] |
| | 22[s,t] | 28[r] | 30 (two) |
| | 22[†] | 28[r] | 30 (two) |
| Cable Redundant (1c) or | 20[s,t] | 28[r] | 31 |
| Cable Ring (1d) | 20 | 28 | 32 |
| | 24 | 28[r] | 31 |
| | 25[s] | 28[r] | 33 |
| | 25[s] | 28 | 34 |

*ports should be assigned for use will ONUs having modulators
[i]two routers are preferably configured identically
[r]COT preferably reassigns wavelengths
[s]has switching at the ONU
[t]ONU has a tunable source
[†]not preferred due to high loss of signal

Performance Issues

The different combinations of ONUs, COTs, and couplers shown in Table 1 have a variety of advantages. One factor considered is optical loss. Optical loss is important, because a low optical loss allows COs to serve a wider area, which reduces the number of expensive COs that are deployed. Another factor considered is the largest failure group size for a single event. In the unprotected network, a single cable cutjust outside the CO could affect M×N users, where M is the number of fibers in the cable and N is the number of ONUs per fiber. M could be anywhere from a hundred to thousands, depending on the local housing density.

Full-fiber redundant networks, such as those shown by FIGS. 3 and 5, provide the highest reliability, but at the greatest cost. Every ONU is protected against cable cuts. Although there is 3 dB additional optical loss, that loss could probably be overcome by using lasers which are tightly coupled to the fiber in the ONU, and a higher power laser in the CO transceiver.

Also, if the PON uses only one fiber for upstream and downstream transmission, there need not be an additional 3 dB of optical loss relative to the baseline system. For example, in such a network, ONU 900 may be used in an unprotected network, and ONU 1000 may be used in a network having full-fiber redundancy. Replacing the 1×2 coupler 920 of ONU 900 with the 2×2 coupler 1020 of ONU 1000 does not introduce any additional loss, assuming that the couplers are power-splitting couplers, not coarse WDMs.

A cable-redundant network having separate cables, such as that shown by FIG. 4, is less expensive than full-fiber redundant networks, but does not offer protection against cuts occurring between the RN and the ONU. The transmission performance along either path should be identical to the performance of the unprotected system.

A cable-redundant network having a cable ring, such as that shown in FIG. 6, provides the same level of protection as the cable-redundant network having separate cables. However, one of the paths around the cable ring may have more optical loss. In particular, if a CAP is located near the CO, one path between the CO and the CAP is very short, but the other path goes around nearly the entire ring before reaching the CAP. How acceptable this additional loss is depends on the details of the system. Consider a system where the total acceptable transmission loss along the primary path from the CO to the ONU is $\eta$. Under worst-case conditions, the first CAP is located adjacent to the CO, and the loss from that CAP to one of the ONU's is $\eta$. The optical loss from the CO to the final CAP, taking either path to that CAP, is also $\eta$ (this assumes that the optical loss from the final CAP to the ONU's is negligible). Hence, the loss from the first coupler to the CO along the secondary path would be $3\eta$ (with $\eta$ given in dB). This is clearly a worst-case scenario. In a more realistic system, the cables would be laid carefully so that the loss along both paths was acceptable.

Figure 35:
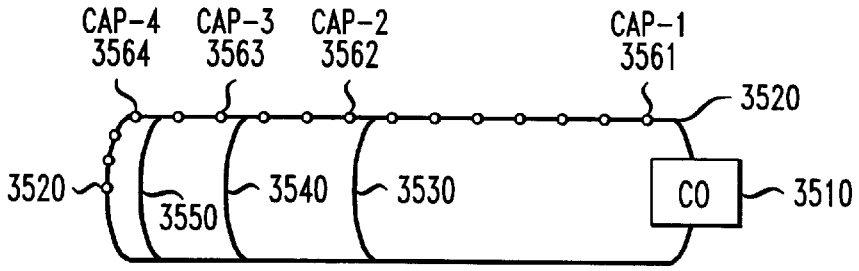
FIG. 35 shows a cable ring adapted to reduce the length of the alternate paths to any given cable access point (CAP) by using nested rings.

FIG. 35 shows a cable ring adapted to reduce the length of alternate paths to any given CAP by using nested rings. A fiber-optic cable 3520 forms an outer ring having both ends connected to a CO 3510. Fiber-optic cables 3530, 3540 and 3550 form intermediate links across the outer ring formed by fiber-optic cable 3520, such that a series of nested rings is formed. For example, the smallest ring includes fiber-optic cable 3530 and the portions of fiber-optic cable 3520 between CO 3510 and fiber-optic cable 3530. CAPs 3561, 3562, 3563 and 3564 are disposed along fiber-optic cable 3520. CAPs may also be disposed on fiber-optic cables 3530, 3540 and 3550.

The ONUs served by a CAP are provided with cable redundancy because there are two independent paths from the CAP to the CO, one in either direction along the ring. The shorter of these paths is referred to as the primary path, and the longer is referred to as the secondary path. If the maximum acceptable transmission distance from the CO to a CAP is L, the maximum circumference of the ring is then $L_{min}+L$, where $L_{min}$ is the distance between the CO and the CAP on the ring nearest the CO. Nested rings allow ONUs close to the CO, which have a low $L_{min}$ and hence a low maximum circumference, to be served by smaller nested rings. At the same time, ONUs further from the CO, which have a higher $L_{min}$ and a higher maximum circumference, may be served by larger nested rings or the outer ring.

For example, suppose that L=5 units, that the outer ring formed by fiber-optic cable 3520 has a circumference of 9 units, and that the primary path to CAP 3561 has a length of 1 unit. The secondary path around the outer ring therefore has a length of 8 units, which is unacceptably large. However, the nested ring that includes fiber-optic cable 3530 has a smaller circumference than the outer ring. For example, this nested ring may have a circumference of 6 units. As a result, the secondary path to CAP 3561 around the nested ring has a length of 5 units, just within acceptable limits.

Further suppose that CAP 3564 is disposed 4 units from CO 3510 along its primary path. The secondary path along the outer ring is therefore 5 units, within acceptable limits.

The split ratio at optical couplers could also be reduced for CAPs that have a secondary path length that would otherwise be longer than the acceptable limit. Reducing the split ratio reduces the optical loss at the coupler, which increases the allowable transmission loss between the CO and the coupler. The cost of this alternative is that reducing the split ratio reduces the number of ONUs that may be connected to the coupler. Also, the couplers at which a signal is divided for transmission along the primary and secondary paths may divide the power of the signal unevenly to compensate for a longer secondary path.

In addition, it may be acceptable to have a lower signal quality over the secondary path relative to the primary path. In such a situation, the secondary path would only be used when the primary path fails, and the primary path would be repaired as soon as possible. When the secondary path is used, the available bit rate could be lowered, to accommodate the lower signal-to-noise ratio over the optical link.

Cost Comparison

Costs depend on many parameters, some of which are very dependent on the physical topography of a particular system. As a result, this cost analysis is very qualitative.

A PON can be broken into six parts, for purposes of cost analysis, each of which will have an associated cost per home: (i) the ONU, (ii) the installed fiber from the coupler to the ONU, (iii) the coupler, (iv) the fiber from the coupler to the cable (including the splices), (v) the installed fiber-optic cable, including fiber management in the CO and installation of conduit, and (vi) the COT.

In a fully redundant network having separate fiber-optic cables, where fiber follows two independent paths from the CO to the ONU, the cost of the outside plant (items (ii), (iii), (iv), and (v)) will approximately double relative to the unprotected system. While the ONU and COT may need to be modified, such modifications should not significantly add to the cost of parts.

In a cable-redundant network having separate fiber-optic cables, where fiber follows two independent paths from the CO to the RN, but there is no protection between the RN and the ONU, the cost of items (iv) and (v) will approximately double relative to the unprotected network. Also, the number of inputs to the coupler from fiber-optic cables will double relative to the unprotected network. This will increase the cost of item (iii), but likely not by a factor of two, as, for example, 1×N couplers are replaced by 2×N couplers. The ONU and COT should not require significant modifications in terms of cost, and any such modifications should be less expensive than those made for the fully redundant system.

It is more difficult to calculate how a cable-ring configuration will affect the cost, as the effect on the price will be more dependent on the local topography. As mentioned earlier, the cable could run directly from the final CAP to the CO, so the amount of conduit installed need not double. The cost per kilometer of the cable may be slightly higher. When the cable is deployed in a ring, the entire ring must contain at least as many fibers as there are couplers, but the cable used in the other architectures need not maintain the highest fiber count from the CO to the final CAP. To approximate an upper limit on the effect this has on the cost of the fiber-optic cable, it may be assumed that the cost per kilometer is proportional to the number of fibers in the cable. It may also be assumed that, in the unprotected system, cable would be replaced with a cable containing half as many fibers after it had traveled half the remaining distance. This implies that the average cost per kilometer of the cable will increase by approximately 50% when the entire cable must contain the maximum fiber count. These assumptions overestimate the cost increase of deploying a ring, since cables containing M fibers actually cost less than twice the amount of cables with M/2 fibers, and because the cost of the additional splices that must be made when changing from a cable with M fibers to one with M/2 fibers has been neglected. Note that this cost increase relates to the average cost per kilometer of the fiber-optic cable, not the cost per home served of the installed cable. In many regions the latter, more relevant number, would be less for the cable ring than for the other restorable architectures. Finally, the cost per CAP may be slightly higher than in the unprotected case, though it should not be as high as in the cable-redundant case since only one CAP is needed per coupler. If the cable from the final CAP to the CO can run in conduit that is shared with other cables, then any increase in cost should be reduced.

Redundant-cable-ring architectures, such as those shown in FIGS. 5 and 6, may require less fiber than redundant architectures having two separate cables, such as those shown in FIGS. 3 and 4. Redundant architectures having two separate cables, or indeed any architecture not having a ring, contain a great deal of unused fiber, since after each CAP an additional fiber in the cable is dark. Because fiber-optic cables contain standard numbers of strands of fiber, usually a power of two, this dark fiber is present until the number of fibers in use becomes equal to the fiber count in a smaller-sized standard fiber-optic cable. At this point, a splice could be performed to reduce the size of the fiber-optic cable. When the fiber-optic cable is deployed in a ring, and an optical fiber is cleaved and used for alternate paths back to the switching node, there is very little dark fiber. However, the amount of savings realized by using a cable ring having very little dark fiber may not be as great as would be expected from merely comparing the amount of dark fiber, because signals in a cable ring may travel through a length of fiber significantly greater than the distance traveled in a network having separate cables.

Monitoring and Repair

Techniques are available that can be used in concert with the network architectures of the present invention to enhance reliability. Monitoring, switching to a back-up system, and repair of the original plant need to be done smoothly. Smart terminals, which support constant monitoring by the central office, and automatic fault location can speed the location and repair of transmission problems. It may also be more cost effective to provide a separate, low-bit-rate access channel, such as a wireless connection, to insure that a customer is never without basic telephony. These issues, while tangential to the architectures of the present invention, are important in providing reliable service.

In the event of a failure, the CO preferably calculates the approximate location of the failure by tracking which ONU's needed to be switched. The CO preferably also provides Optical-Time-Domain-Reflectometer (OTDR) measurements, that give the distance in fiber-kilometer to a cable cut, rather than the location. However, because fiber may be laid with some slack, a separate database may be needed to translate OTDR measurements into locations. Preferably, both OTDR measurements and tracking which ONUs are switched are used to determine the location of a failure. For example, repair workers could be immediately sent to the approximate location of the failure based on which ONUs were switched, while OTDR measurements are taken and compared to previous OTDR measurements to pin-point the location more precisely.

Preferably, the CO is adapted to poll a path under repair, to insure that the repair is being made properly, and that the proper fibers are being spliced together. Additional processing power at the CO may be needed to implement such functionality. Also, such polling would be greatly simplified if each ONU was able to identify itself, so that the CO could confirm that the proper equipment was being connected. If the ONU does not have that capability, then each connection could still be verified, but with more processing. For example, OTDR measurements could be made, and compared to previous OTDR measurements on file, to verify that the proper ONU was being connected to each COT.

Many of the ideas presented thus far can also be applied to architectures which protect against switching node (or Central Office) failures, as well as cable cuts.

Switching Node and Full-Fiber Redundancy

Figure 36:
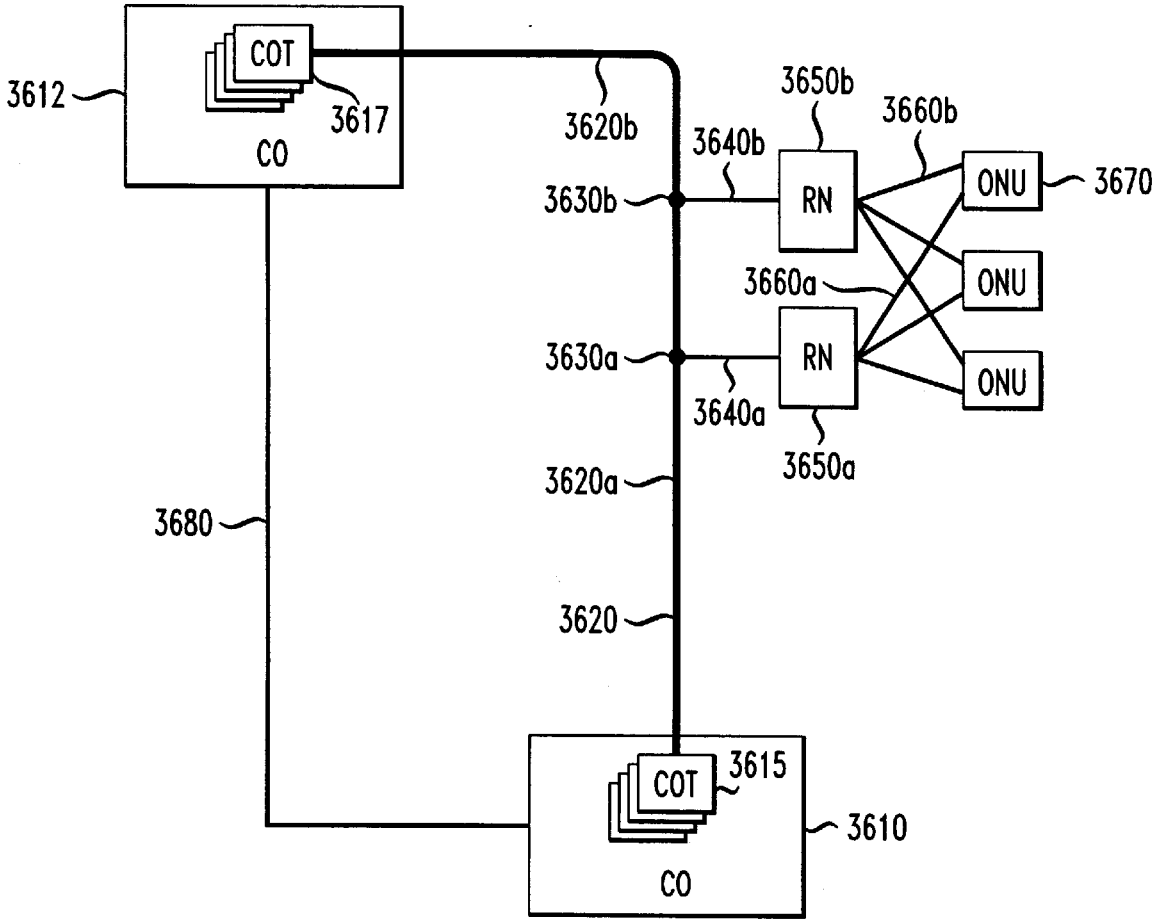
FIG. 36 shows an embodiment of the present invention that provides full-fiber redundancy and protects against the failure of a switching node by using optical fiber to connect an optical network unit to two different switching nodes.

FIG. 36 shows an embodiment of the present invention that provides full-fiber redundancy by using a fiber-optic cable 3620 to connect ONU 3670 to both switching node 3610 and switching node 3612. Switching node 3610 may be a CO having one or more COTs 3615 connected to fiber-optic cable 3620. At a CAP 3630*a*, an optical fiber 3640*a* is separated from fiber-optic cable 3620, and is connected to a RN 3650*a*. An ONU 3670 is connected to RN 3650*a* by an optical fiber 3660*a*. Similarly, at CAP 3630*b*, an optical fiber 3640*b* is separated from fiber-optic cable 3620, and is connected to a RN 3650*b*. Optical fiber 3640*a* is contained by a portion 3620*a* of fiber-optic cable 3620 between CAP 3630*a* and switching node 3610 that does not include CAP 3630*b*. Similarly, optical fiber 3640*b* is contained by a portion 3620*b* of fiber-optic cable 3620 between CAP 3630*b* and switching node 3612 that does not include CAP 3630*a*, such that there is no overlap between portion 3620*a* and portion 3620*b*. ONU 3670 is connected to RN 3650*b* by an optical fiber 3660*b*.

The architecture of FIG. 36 includes two independent paths via optical fiber between ONU 3670 a switching node, one to switching node 3610 and the other to switching node 3612. One of these paths runs through optical fiber 3660*a*, RN 3650*a*, and optical fiber 3640*a*, which is contained by portion 3620*a* of fiber-optic cable 3620, to switching node 3610. The second path runs through optical fiber 3660*b*, RN 3650*b*, and optical fiber 3640*b*, which is contained by portion 3620*b* of fiber-optic cable 3620, to switching node 3612. Similarly, every other ONU in the architecture has two independent paths through optical fiber to switching nodes 3610 and 3612. Both switching nodes 3610 and 3612 are connected to a communications network (not shown). As a result, every ONU in the network will have a path through optical fiber and through a switching node to the communications network, even if an optical fiber or fiber-optic cable is cut anywhere in the local access network, or a switching node fails.

Preferably, optical fibers 3640*a* and 3640*b* are cut from a single optical fiber in fiber-optic cable 3620. Optical fibers 3640*a* and 3640*b* are considered separate fibers even where they are cut from what was previously a single optical fiber. Separating optical fiber 3640*a* from fiber-optic cable 3620 at CAP 3630*a* leaves an unused length of fiber running through fiber-optic cable from CAP 3630*a* to 3630*b* and then to switching node 3612. CAPs 3630*a* and 3630*b* are usually located near each other, such that cutting optical fibers 3640*a* and 3640*b* from the same optical fiber of fiber-optic cable 3620 results in very little "dark," ire., unused, fiber.

As with the architecture of FIG. 5, CAPs 3630*a* and 3630*b* are preferably located sufficiently far apart that the likelihood of a single event causing a failure at both CAPs is low. However, to reduce installation costs, CAPs 3630*a* and 3630*b* may be combined into a single CAP. A single CAP may also be used to provide service to different RNs connected to different ONUs.

In the architecture of FIG. 36, there are two COTs, such as COTs 3615 and 3617, per remote node. These COTs are preferably designed in accordance with FIG. 14 or 16 for a broadcast PON, or FIGS. 26 or 27 for a WDM-PON. ONUs suitable for use in the architecture of FIG. 5 are also suitable for use in the architecture of FIG. 36.

Which switching node is used to connect ONU 3670 to the communications network (not shown) may be controlled at switching node 3610, switching node 3612, ONU 3670, or elsewhere, such as in the communications network (not shown). Regardless of where the connection-control is located, both switching nodes and the communications network are preferably informed of the connection status. Preferably, there is a communications channel 3680 between switching nodes 3610 and 3612. Preferably, communications channel 3680 is independent of any optical fiber that is used to connect switching nodes 3610 and 3612 to ONU 3670, i.e., the communication channel does not share a fiber-optic cable with the first optical fiber, and does not share a fiber-optic cable with the second optical fiber. An independent communication channel reduces the chance that the same event that causes a failure in the optical fiber used to connect switching nodes and ONUs will also cause a failure in the communication channel. For example, communications channel 3680 may be supported by the communications network (not shown).

Switching Node and Cable Redundancy

Figure 37:
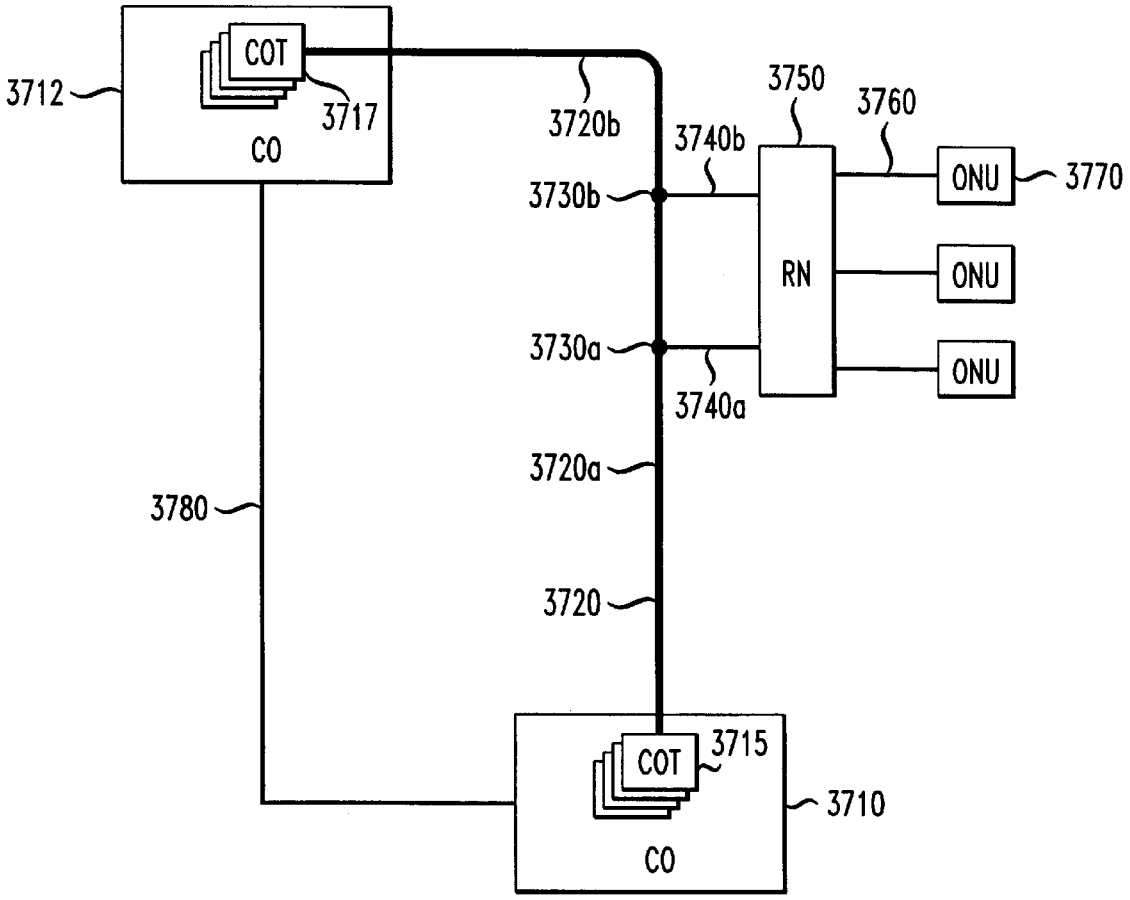
FIG. 37 shows an embodiment of the present invention that provides cable redundancy and protects against the failure of a switching node by using a fiber-optic cable to connect an RN to two different switching nodes.

FIG. 37 shows an embodiment of the present invention that provides cable redundancy by using a fiber-optic cable 3720 to connect RN 3750 to switching node 3710 and switching node 3712. Switching nodes 3710 and 3712 may be COs having one or more COTs 3715 and 3717, respectively, connected to fiber-optic cable 3720. At a CAP 3730*a*, an optical fiber 3740*a* is separated from fiber-optic cable 3720, and is connected to a RN 3750. Optical fiber 3740*a* is contained by a portion 3720*a* of fiber-optic cable 3720 between CAP 3730*a* and switching node 3710. Similarly, at a CAP 3730*b*, an optical fiber 3740*b* is separated from fiber-optic cable 3720, and is connected to RN 3750. Optical fiber 3740*b* is contained by a portion 3720*b* of fiber-optic cable 3720 between CAP 3730*b* and switching node 3712, such that there is no overlap between portion 3720*a* and portion 3720*b*. An ONU 3770 is connected to RN 3750 by an optical fiber 3760.

The architecture of FIG. 37 includes two independent paths via optical fiber between RN 3750 and a switching node, one to switching node 3710 and the other to switching node 3712. One of these paths runs through optical fiber 3740*a*, which is contained by portion 3720*a* of fiber-optic cable 3720, to switching node 3710. The second path runs through optical fiber 3740*b*, which is contained by[]portion 3720*b* of fiber-optic cable 3720, to switching node 3712. However, there is only a single path from RN 3750 to ONU 3770, through optical fiber 3760. Similarly, there are two independent paths between each RN in the network, one to switching node 3710, and the other to switching node 3712.

COTs 3715 and 3717 preferably have a design similar to those shown in FIGS. 14 and 16, for use in a broadcast PON, or similar to those shown in FIGS. 26 and 27, for use in a WDM-PON. ONU 3770 preferably has a design similar to those preferred for use in the architecture of FIG. 6.

Which switching node, selected from switching nodes 3710 and 3712, is used to connect ONU 3770 to the communications network (not shown) may be controlled at switching node 3710, switching node 3712, COT 3715, COT 3717, or elsewhere, such as in the communications network (not shown). Preferably, the choice of switching node is not controlled at ONU 3770, because a single COT in the selected switching node, such as COT 3715 in switching node 3710, preferably serves a plurality of ONUs connected via RN 3750, and it is preferable to avoid a situation where one ONU makes a selection that affects other ONUs. Regardless of where the connection-control is located, both switching nodes and the communications network are preferably informed of the connection status.

Preferably, there is a communications channel 3780 between switching nodes 3710 and 3712, similar to communications channel 3680 of FIG. 36.

Those with skill in the art may recognize various modifications to the embodiments of the invention described and illustrated herein. Such modifications are meant to be covered by the spirit and scope of the appended claims.

What is claimed is:

1. A local access network, comprising:

a switching node;

a passive remote node connected to an optical network unit;

a first optical fiber that provides a dedicated connection between the switching node and the passive remote node; and a second optical fiber that provides a dedicated connection between the switching node and the passive remote node;

wherein a first portion of a first fiber-optic cable containing the first optical fiber does not contain any part of the second optical fiber.

2. The local access network of claim 1, wherein the switching node is a central office.

3. The local access network of claim 1, wherein the passive remote node is an optical coupler.

4. The local access network of claim 1, wherein the passive remote node is a wavelength-grating router.

5. The local access network of claim 1, wherein:

the first optical fiber provides a direct connection between the switching node and the passive remote node; and the second optical fiber provides a direct connection between the switching node and the passive remote node.

6. The local access network of claim 1, wherein the second optical fiber is contained by a second fiber-optic cable.

7. The local access network of claim 1, wherein the first fiber-optic cable forms a ring, and the second optical fiber is contained by a second portion of the first fiber-optic cable.

8. The local access network of claim 4, wherein the optical network unit is adapted to transmit signals having different wavelengths.

9. The local access network of claim 1, wherein the optical network unit is adapted to transmit signals that always have the same wavelength.

10. The local access network of claim 1, wherein:

(a) the switching node has a switch adapted to select a path, between the switching node and the remote node, from the group consisting of:

(1) a first path including the first optical fiber, and (2) a second path including the second optical fiber;

(b) the switching node is adapted to transmit to the optical network unit via the selected path; and (c) the optical network unit is adapted to transmit to the switching node via the first path and the second path simultaneously, and the switching node is adapted to receive only via the selected path.

11. The local access network of claim 1, further comprising:

a third optical fiber that provides a dedicated connection between the switching node and the passive remote node;

a fourth optical fiber that provides a, dedicated connection between the switching node and the passive remote node;

wherein a first portion of the first fiber-optic cable containing the third optical fiber does not contain any part of the fourth optical fiber.

12. The local access network of claim 11, wherein:

(a) the switching node has a first switch adapted to select a path, between the switching node and the passive remote node, from the group consisting of:

(1) a first path including the first optical fiber, and (2) a second path including the second optical fiber;

(b) the switching node has a second switch adapted to select a path, between the switching node and the passive remote node, from the group consisting of:.

(1) a third path including the third optical fiber, and (2) a fourth path including the fourth optical fiber;

(c) the switching node is adapted to transmit to the optical network unit via the path selected by the first switch; and (d) the optical network unit is adapted to transmit to the switching node via both the third path and the fourth path simultaneously, and the switching node is adapted to receive only via the path selected by the second switch.

13. A local access network, comprising:

a switching node;

a first passive remote node;

a first optical fiber connecting the switching node to the first passive remote node;

a second passive remote node;

a second optical fiber connecting the switching node to the second passive remote node;

an optical network unit;

a third optical fiber connecting the first passive remote node to the optical network unit;

a fourth optical fiber connecting the second passive remote node to the optical network unit;

wherein a first portion of a first fiber-optic cable containing the first optical fiber does not contain any part of the second optical fiber.

14. The local access network of claim 13, wherein the switching node is a central office.

15. The local access network of claim 13, wherein the first and second passive remote nodes are optical couplers.

16. The local access network of claim 13, wherein the first and second passive remote nodes are wavelength-grating routers.

17. The local access network of claim 13, wherein: the first optical fiber provides a direct connection between the switching node and the first passive remote node; and the second optical fiber provides a direct connection between the switching node and the second passive remote node.

18. The local access network of claim 13, wherein the second optical fiber is contained by a second fiber-optic cable.

19. The local access network of claim 13, wherein the first fiber-optic cable forms a ring, and the second optical fiber is contained by a second portion of the first fiber-optic cable.

20. The local access network of claim 13, wherein the optical network unit is adapted to perform switching.

21. The local access network of claim 13, wherein the optical network unit is not adapted to perform switching.

22. The local access network of claim 13, wherein:

(a) the switching node has a switch adapted to select a path, between the switching node and the optical network unit, from the group consisting of:

(1) a first path including the first optical fiber, the first passive remote node, and the third optical fiber, and (2) a second path including the second optical fiber, the second passive remote node, and the fourth optical fiber;

(b) the switching node is adapted to transmit to the optical network unit via the selected path; and (c) the optical network unit is adapted to transmit to the switching node via the first path and the second path simultaneously, and the switching node is adapted to receive only via the selected path.

23. The local access network of claim 13, farther comprising:

a fifth optical fiber connecting the switching node to the first passive remote node;

a sixth optical fiber connecting the switching node to the second passive remote node;

a seventh optical fiber connecting the first passive remote node to the optical network unit;

an eighth optical fiber connecting the second passive remote node to the optical network unit;

wherein a first portion of the first fiber-optic cable containing the fifth optical fiber does not contain any part of the sixth optical fiber.

24. The local access network of claim 23, wherein:

(a) the switching node has a first switch adapted to select a path, between the switching node and the optical network unit, from the group consisting of:

(1) a first path including the first optical fiber, the first passive remote node, and the third optical fiber, and (2) a second path including the second optical fiber, the second passive remote node, and the fourth optical fiber;

(b) the switching node has a second switch adapted to select a path from the group consisting of:

(1) a third path including the fifth optical fiber, the first passive remote node, and the seventh optical fiber, and (2) a fourth path including the sixth optical fiber, the second passive remote node, and the eighth optical fiber;

(c) the switching node is adapted to transmit to the optical network unit via the path selected by the first switch; and (d) the optical network unit is adapted to transmit to the switching node via both the third path and the fourth path simultaneously, and the switching node is adapted to receive only via the path selected by the second switch.

25. A local access network, comprising:

a switching node;

an optical network unit;

a first optical fiber that provides a dedicated connection between the switching node and the optical network unit;

a second optical fiber that provides a dedicated connection between the switching node and the optical network unit;

wherein a first portion of a first fiber-optic cable containing the first optical fiber does not contain any part of the second optical fiber.

26. The local access network of claim 25, wherein the second optical fiber is contained by a second fiber-optic cable.

27. The local access network of claim 25, wherein the first fiber-optic cable forms a ring, and the second optical fiber is contained by a second portion of the first fiber-optic cable.

28. The local access network of claim 25, wherein:

(a) the switching node has a switch adapted to select a path, between the switching node and the optical network unit, from the group consisting of:

(1) a first path including the first optical fiber, and (2) a second path including the second optical fiber;

(b) the switching node is adapted to transmit to the optical network unit via the selected path; and (c) the optical network unit is adapted to transmit to the switching node via the first path and the second path simultaneously, and the switching node is adapted to receive only via the selected path.

29. A local access network, comprising:

a first switching node;

a second switching node;

a passive remote node connected to an optical network unit;

a first optical fiber that provides a dedicated connection between the first switching node and the passive remote node;

a second optical fiber that provides a dedicated connection between the second switching node and the passive remote node;

wherein a first portion of a first fiber-optic cable containing the first optical fiber does not contain any part of the second optical fiber.

30. The local access network of claim 29, further comprising an independent communication channel between the first switching node and the second switching node.

31. The local access network of claim 29, wherein the second optical fiber is contained by a second portion of the first fiber-optic cable.

32. A local access network, comprising:

a first switching node;

a first passive remote node;

a first optical fiber connecting the first switching node to the first passive remote node;

a second switching node;

a second passive remote node;

a second optical fiber connecting the second switching node to the second passive remote node;

an optical network unit;

a third optical fiber connecting the first passive remote node to the optical network unit;

a fourth optical fiber connecting the second passive remote node to the optical network unit;

wherein a first portion of a first fiber-optic cable containing the first optical fiber does not contain any part of the second optical fiber.

33. The local access network of claim 32, further comprising an independent communication channel between the first switching node and the second switching node.

34. The local access network of claim 32, wherein the second optical fiber is contained by a second portion of the first fiber-optic cable.

35. A method of providing protection against loss of service in a local access network, comprising the steps of:

transmitting data between a switching node and a first passive remote node via a first dedicated connection, wherein the first dedicated connection includes a first optical fiber;

monitoring the first dedicated connection for a failure; and if a failure is detected, transmitting data between the switching node and the first passive remote node via a second dedicated connection, wherein the second dedicated connection includes a second optical fiber;

wherein a first portion of a first fiber-optic cable containing the first optical fiber does not contain any part of the second optical fiber.

36. A method of providing protection against loss of service in a local access network, comprising the steps of:

transmitting data between a switching node and an optical network unit via a first dedicated connection, wherein the first dedicated connection includes a first optical fiber connecting the switching node to a first passive remote node;

monitoring the first dedicated connection for a failure; and if a failure is detected, transmitting data between the switching node and the optical network unit via a second dedicated connection, wherein the second dedicated connection includes a second optical fiber connecting the switching node to a second passive remote node;

wherein a first portion of a first fiber-optic cable containing the first optical fiber does not contain any part of the second optical fiber.

* * * * *